(12) United States Patent
Peters, III et al.

(10) Patent No.: US 8,896,695 B2
(45) Date of Patent: Nov. 25, 2014

(54) RETINAL CONCAVE ARRAY COMPOUND CAMERA SYSTEM

(75) Inventors: Leo J. Peters, III, Houston, TX (US); Chester L. Smitherman, Houston, TX (US)

(73) Assignee: Visual Intelligence LP, Houston, TX (US)

( * ) Notice: Subject to any disclaimer, the term of this patent is extended or adjusted under 35 U.S.C. 154(b) by 1241 days.

(21) Appl. No.: 12/462,533

(22) Filed: Aug. 5, 2009

(65) Prior Publication Data

US 2009/0295924 A1 Dec. 3, 2009

Related U.S. Application Data

(62) Division of application No. 10/229,626, filed on Aug. 28, 2002, now Pat. No. 7,893,957.

(51) Int. Cl.
*H04N 7/18* (2006.01)
*H04N 5/232* (2006.01)
*G01C 11/02* (2006.01)

(52) U.S. Cl.
CPC .......... *H04N 5/23238* (2013.01); *H04N 5/232* (2013.01); *G01C 11/025* (2013.01)
USPC ...................................... 348/144

(58) Field of Classification Search
USPC ..................... 348/143, 144; 250/226; 396/12
See application file for complete search history.

(56) References Cited

U.S. PATENT DOCUMENTS

| | | |
|---|---|---|
| 1,699,136 A | 1/1929 | Eliel |
| 1,910,425 A | 5/1933 | Cahill |
| 2,036,062 A | 3/1936 | Lutz |
| 2,104,976 A | 1/1938 | Eliel |
| 2,433,534 A | 12/1947 | Sonne |
| 2,720,029 A | 10/1955 | Eliel |
| 2,747,012 A | 5/1956 | Dresser |
| 2,896,501 A | 7/1959 | Stamps |
| 2,955,518 A | 10/1960 | Perry |
| 2,988,953 A | 6/1961 | Barnett |
| 3,109,057 A | 10/1963 | Slavecki et al. |

(Continued)

FOREIGN PATENT DOCUMENTS

| | | |
|---|---|---|
| DE | 2811428 A1 | 9/1979 |
| DE | 19714396 A1 | 10/1998 |

(Continued)

OTHER PUBLICATIONS

CA Nov. 26, 2011 Examiner's Report issued for Canadian Patent Application 2,534,968.

(Continued)

*Primary Examiner* — Allen Wong
(74) *Attorney, Agent, or Firm* — Gardere Wynne Sewell LLP; Chris P. Perque; Teresa J. Lechner-Fish

(57) ABSTRACT

The present invention provides a camera system having a compound array of imaging sensors disposed in a retinal configuration. The system preferably comprises a concave housing. A first imaging sensor is centrally disposed along the housing. At least one secondary imaging sensor is disposed along the housing, adjacent to the first imaging sensor. The focal axis of the second imaging sensor, in the preferred embodiment, intersects with the focal axis of the first imaging sensor within an intersection area.

28 Claims, 5 Drawing Sheets

(56) References Cited

U.S. PATENT DOCUMENTS

| | | |
|---|---|---|
| 3,518,929 A | 7/1970 | Glenn |
| 3,527,880 A | 9/1970 | Gordon |
| 4,217,607 A | 8/1980 | Cohen |
| 4,313,678 A | 2/1982 | Colvocoresses |
| 4,322,741 A | 3/1982 | Kawabayashi |
| 4,398,195 A | 8/1983 | Dano |
| 4,504,914 A | 3/1985 | Hofmann |
| 4,543,603 A | 9/1985 | Laures |
| 4,583,703 A | 4/1986 | Kline |
| 4,650,305 A | 3/1987 | Hines |
| 4,686,474 A | 8/1987 | Olsen et al. |
| 4,689,748 A | 8/1987 | Hofmann |
| 4,708,472 A | 11/1987 | Hofmann |
| 4,712,010 A | 12/1987 | Alm |
| 4,724,449 A | 2/1988 | Wright |
| 4,750,810 A | 6/1988 | Tomlin et al. |
| 4,754,327 A | 6/1988 | Lippert |
| 4,757,378 A | 7/1988 | Hackett, Jr. et al. |
| 4,764,008 A | 8/1988 | Wren |
| 4,814,711 A | 3/1989 | Olsen et al. |
| 4,887,779 A | 12/1989 | Large |
| 4,935,629 A | 6/1990 | Livermore et al. |
| 4,951,136 A | 8/1990 | Drescher et al. |
| 4,956,705 A | 9/1990 | Wright |
| 4,964,721 A | 10/1990 | Ulich et al. |
| 4,965,572 A | 10/1990 | Adamson |
| 5,013,917 A | 5/1991 | Ulich |
| 5,027,199 A | 6/1991 | Suzuki |
| 5,029,009 A | 7/1991 | Ulich et al. |
| 5,045,937 A | 9/1991 | Myrick |
| 5,104,217 A | 4/1992 | Pleitner et al. |
| 5,138,444 A | 8/1992 | Hiramatsu |
| 5,166,789 A | 11/1992 | Myrick |
| 5,187,754 A | 2/1993 | Currin et al. |
| 5,193,124 A | 3/1993 | Subbarao |
| 5,198,657 A | 3/1993 | Trost et al. |
| 5,231,401 A | 7/1993 | Kaman et al. |
| 5,247,356 A | 9/1993 | Ciampa |
| 5,249,034 A | 9/1993 | Minato |
| 5,259,037 A | 11/1993 | Plunk |
| 5,262,953 A | 11/1993 | de Waard et al. |
| 5,266,799 A | 11/1993 | Steinitz et al. |
| 5,276,321 A * | 1/1994 | Chang et al. ............... 250/226 |
| 5,308,022 A | 5/1994 | Cronkhite et al. |
| 5,317,394 A | 5/1994 | Hale et al. |
| 5,332,968 A | 7/1994 | Brown |
| 5,347,539 A | 9/1994 | Sridhar et al. |
| 5,371,358 A | 12/1994 | Chang et al. |
| 5,379,065 A | 1/1995 | Cutts |
| 5,414,462 A | 5/1995 | Veatch |
| 5,426,476 A * | 6/1995 | Fussell et al. ............... 396/12 |
| 5,448,936 A | 9/1995 | Turner |
| 5,450,125 A | 9/1995 | Ulich et al. |
| 5,467,271 A | 11/1995 | Abel et al. |
| 5,471,056 A | 11/1995 | Prelat |
| 5,517,419 A | 5/1996 | Lanckton et al. |
| 5,555,018 A | 9/1996 | Von Braun |
| 5,557,397 A | 9/1996 | Hyde et al. |
| 5,596,494 A | 1/1997 | Kuo |
| 5,604,534 A | 2/1997 | Hedges et al. |
| 5,625,409 A | 4/1997 | Rosier et al. |
| 5,633,946 A | 5/1997 | Lachinski et al. |
| 5,639,964 A | 6/1997 | Djorup |
| 5,668,593 A | 9/1997 | Lareau et al. |
| 5,721,611 A | 2/1998 | Kellner |
| 5,734,507 A | 3/1998 | Harvey |
| 5,765,044 A | 6/1998 | Murai et al. |
| 5,790,188 A | 8/1998 | Sun |
| 5,815,314 A | 9/1998 | Sudo |
| 5,872,590 A | 2/1999 | Aritake et al. |
| 5,878,356 A | 3/1999 | Garrot et al. |
| 5,894,323 A | 4/1999 | Kain et al. |
| 5,937,212 A | 8/1999 | Kurahashi et al. |
| 5,953,054 A | 9/1999 | Mercier |
| 5,963,664 A | 10/1999 | Kumar et al. |
| 5,982,951 A | 11/1999 | Katayama et al. |
| 6,002,815 A | 12/1999 | Immega et al. |
| 6,005,987 A | 12/1999 | Nakamura et al. |
| 6,055,012 A | 4/2000 | Haskell et al. |
| 6,075,905 A | 6/2000 | Herman et al. |
| 6,078,701 A | 6/2000 | Hsu et al. |
| 6,087,984 A | 7/2000 | Keller et al. |
| 6,125,329 A | 9/2000 | Place et al. |
| 6,130,705 A | 10/2000 | Lareau et al. |
| 6,173,087 B1 | 1/2001 | Kumar et al. |
| 6,204,799 B1 | 3/2001 | Caputi, Jr. |
| 6,211,906 B1 | 4/2001 | Sun |
| 6,281,970 B1 | 8/2001 | Williams et al. |
| 6,282,301 B1 | 8/2001 | Haskett |
| 6,323,858 B1 | 11/2001 | Gilbert et al. |
| 6,353,409 B1 | 3/2002 | Keller et al. |
| 6,393,163 B1 | 5/2002 | Burt et al. |
| 6,422,508 B1 | 7/2002 | Barnes |
| 6,434,280 B1 | 8/2002 | Peleg et al. |
| 6,456,938 B1 | 9/2002 | Barnard |
| 6,473,119 B1 * | 10/2002 | Teuchert ............... 348/144 |
| 6,542,831 B1 | 4/2003 | Moosmuller et al. |
| 6,553,311 B2 | 4/2003 | Ahearn et al. |
| 6,570,612 B1 | 5/2003 | Saund et al. |
| 6,597,818 B2 | 7/2003 | Kumar et al. |
| 6,597,991 B1 | 7/2003 | Meron et al. |
| 6,611,289 B1 | 8/2003 | Yu et al. |
| 6,664,529 B2 | 12/2003 | Pack et al. |
| 6,694,094 B2 | 2/2004 | Partynski et al. |
| 6,711,475 B2 | 3/2004 | Murphy |
| 6,747,686 B1 | 6/2004 | Bennett |
| 6,766,226 B2 | 7/2004 | Andersen |
| 6,771,208 B2 | 8/2004 | Lutter et al. |
| 6,781,707 B2 | 8/2004 | Peters et al. |
| 6,826,358 B2 | 11/2004 | Partynski et al. |
| 6,834,163 B2 | 12/2004 | Trunz |
| 6,954,310 B2 | 10/2005 | Holloway et al. |
| 7,006,132 B2 | 2/2006 | Pereira et al. |
| 7,006,709 B2 | 2/2006 | Kang et al. |
| 7,009,638 B2 | 3/2006 | Gruber et al. |
| 7,019,777 B2 | 3/2006 | Sun |
| 7,127,348 B2 | 10/2006 | Smitherman et al. |
| 7,184,072 B1 | 2/2007 | Loewen et al. |
| 7,339,614 B2 | 3/2008 | Gruber et al. |
| 7,365,774 B2 | 4/2008 | Louis et al. |
| 7,424,133 B2 | 9/2008 | Schultz et al. |
| 7,437,062 B2 | 10/2008 | Holcomb |
| 7,725,258 B2 | 5/2010 | Smitherman |
| 7,787,659 B2 | 8/2010 | Schultz et al. |
| 7,995,799 B2 | 8/2011 | Schultz et al. |
| 8,068,643 B2 | 11/2011 | Schultz et al. |
| 2002/0060784 A1 | 5/2002 | Pack et al. |
| 2002/0101438 A1 | 8/2002 | Ham et al. |
| 2002/0163582 A1 | 11/2002 | Gruber et al. |
| 2003/0048357 A1 | 3/2003 | Kain et al. |
| 2003/0081827 A1 | 5/2003 | Paz-Pujalt et al. |
| 2003/0138247 A1 | 7/2003 | Trunz et al. |
| 2003/0169259 A1 | 9/2003 | Lavelle et al. |
| 2003/0210336 A1 | 11/2003 | Khan et al. |
| 2004/0041914 A1 | 3/2004 | Peters, III et al. |
| 2007/0046448 A1 | 3/2007 | Smitherman |
| 2008/0278828 A1 | 11/2008 | Rau et al. |
| 2009/0295924 A1 | 12/2009 | Peters, III et al. |
| 2010/0235095 A1 | 9/2010 | Smitherman |
| 2011/0091076 A1 | 4/2011 | Schultz et al. |
| 2012/0020571 A1 | 1/2012 | Schultz et al. |

FOREIGN PATENT DOCUMENTS

| | | |
|---|---|---|
| DE | 10341822 A1 | 9/2005 |
| EP | 0494700 A2 | 7/1992 |
| EP | 1069547 A1 | 1/2001 |
| EP | 1178283 A1 | 2/2002 |
| EP | 1189021 A1 | 3/2002 |
| GB | 2284273 A | 1/1997 |
| JP | 7028400 A | 1/1995 |
| JP | 8030194 A | 2/1996 |
| JP | 8335298 A | 12/1996 |
| WO | WO-99/18732 A1 | 4/1999 |

(56) References Cited

FOREIGN PATENT DOCUMENTS

| WO | WO-99/34346 A1 | 7/1999 |
|---|---|---|
| WO | WO-02/06892 A2 | 1/2002 |
| WO | WO-02/65155 A1 | 8/2002 |

OTHER PUBLICATIONS

CN Apr. 25, 2007 Response to Office Action for Chinese Patent Application 03820463.0.
EP Jul. 15, 2010 Communication Pursuant to Article 94(3) EPC for European Patent Application 03755838.3.
EP Oct. 10, 2011 Summons to Attend Oral Proceedings for European Patent Application 03755838.
EP Jul. 13, 2012 Statement of Grounds for European Patent Application 03755838.4.
IN Apr. 13, 2007 Response to Office Action mailed Feb. 12, 2007 for Indian Patent Application 773/DELP/2005.
Feb. 22, 2005 Response to Office Action/Final Rejection mailed Dec. 22, 2004 for U.S. Appl. 10/247,441, filed Sep. 19, 2002.
Mar. 16, 2005 Notice of Allowance for U.S. Appl. No. 10/247,441, filed Sep. 19, 2002.
May 19, 2005 Office Action mailed for U.S. Appl. 10/244,980, filed Sep. 17, 2002.
Aug. 19, 2005 Examiner's Interview Summary mailed for U.S. Appl. No. 10/664,737, filed Sep. 18, 2003.
Feb. 3, 2006 Notice of Allowance mailed for U.S. Appl. No. 10/664,737, filed Sep. 18, 2003.
Feb. 13, 2006 Notice of Allowance for U.S. Appl. No. 10/664,737, filed Sep. 18, 2003.
Jun. 20, 2006 Notice of Allowance mailed for U.S. Appl. No. 10/664,737, filed Sep. 18, 2003.
Jan. 5, 2007 Notice of Allowance for U.S. Appl. No. 10/244,980, filed Sep. 17, 2002.
Feb. 28, 2007 Response to Office Action/Final Rejection for U.S. Appl. No. 10/229,626, filed Aug. 28, 2002.
Mar. 21, 2007 Response to Office Action mailed Nov. 20, 2006 for U.S. Appl. No. 11/128,656, filed May 13, 2005.
Dec. 19, 2008 Response to Office Action mailed Jul. 17, 2008 for U.S. Appl. No. 11/128,656, filed May 13, 2005.
Mar. 3, 2009 Office Action mailed for U.S. Appl. 11/128,656, filed May 13, 2005.
May 19, 2009 Response to Office Action mailed Mar. 17, 2009 for U.S. Appl. No. 10/229,626.
Jul. 30, 2009 Notice of Allowance mailed for U.S. Appl. No. 11/128,656, filed May 13, 2005.
Dec. 14, 2009 Office Action mailed for U.S. Appl. No. 11/581,235, filed Oct. 11, 2006.
Jan. 12, 2010 Notice of Allowance mailed for U.S. Appl. No. 11/581,235, filed Oct. 11, 2006.
Mar. 2, 2010 Response to Office Action and Request for Reconsideration with Examiner's Interview Summary for Office Action mailed Oct. 5, 2009 for U.S. Appl. 10/229,626, filed Aug. 28, 2002.
Mar. 5, 2010 Office Action/Non-Final Rejection mailed for U.S. Appl. No. 11/805,109.
Mar. 17, 2010 Preliminary Amendment for U.S. Appl. No. 12/462,533, filed Aug. 5, 2009.
Jun. 21, 2010 Notice of Allowance mailed for U.S. Appl. No. 10/229,626.
Aug. 5, 2010 Office Action/Final Rejection for U.S. Appl. No. 11/805,109, filed May 22, 2007.
Nov. 2, 2010 Response to Office Action Non-Final Rejection mailed Aug. 5, 2010 / Request for Continued Examination for U.S. Appl. No. 11/805,109, filed May 22, 2007.
Dec. 13, 2010 Notice of Allowance for U.S. Appl. No. 12/462,563, filed Aug. 5, 2009.
Jan. 10, 2011 Notice of Allowability for U.S. Appl. No. 11/805,109, filed May 22, 2007.
Jul. 30, 2012 Preliminary Amendment for U.S. Appl. No. 12/462,533, filed Aug. 5, 2009.
Feb. 27, 2013 Response to Office Action mailed Sep. 6, 2012 for U.S. Appl. No. 12/798,899, filed Apr. 13, 2010.
Feb. 27, 2013 Notice of Allowability mailed for U.S. Appl. 12/583,815, filed Aug. 26, 2009.
Burt, Peter J., et al. "A Multiresolution Spline with Application to Image Mosiacs" ACM Transactions on Graphics, vol. 2, No. 4, Oct. 1983, pp. 217-236.
Mohamed M.R. Mostafa, Joe Hutton: Emerge DSS: A Fully Digital System for Airborne Mapping; Sep. 22-23, 2003; http://www.isprs.org/commission1/theory_tech_realities/.
Richard D. Sanchez; Airborne Digital Sensor System and GPS-aided Inertial Technology for Direct Geopositioning in Rough Terrain; Open-File Report 2004-1391; USGS; Reston, VA.
Non-Final Rejection dated Oct. 5, 2009 for U.S. Appl. No. 10/229,626.
Final Rejection dated Mar. 17, 2009 for U.S. Appl. No. 10/229,626.
Non-Final Rejection dated Aug. 20, 2008 for U.S. Appl. No. 10/229,626.
Final Rejection dated Dec. 7, 2007 for U.S. Appl. No. 10/229,626.
Non-Final Rejection dated Jul. 6, 2007 for U.S. Appl. No. 10/229,626.
Advisory Action dated Mar. 29, 2007 for U.S. Appl. No. 10/229,626.
Final Rejection dated Nov. 17, 2006 for U.S. Appl. No. 10/229,626.
Non-Final Rejection dated Jan. 11, 2006 for U.S. Appl. No. 10/229,626.
EP Supplemental Search Report (EP 03791891 May 14, 2007).
EP Supplemental Search Report (EP 03755838 Sep. 29, 2008).
International Search Report dated Feb. 7, 2005 for PCT application No. PCT/US03/29375.
International Preliminary Examination Report dated Dec. 13, 2004 for PCT application No. PCT/US03/26950.
International Search Report dated Oct. 20, 2004 for PCT application No. PCT/US03/26950.
International Search Report dated Apr. 6, 1999 for PCT application No. PCT/JP98/05679.
Communication pursuant to Article 94(3) EPC in EP App. No. 03 755 838.3—1236, dated Jul. 15, 2010.
Final Rejection for U.S. Appl. No. 11/805,109, mailed on Aug. 5, 2010.
AU Aug. 20, 2007 Examiner's Report issued for Australian Patent Application 2003/262941.
AU Apr. 11, 2008 Examiner's Report issued for Australian Patent Application 2003/273338.
CA Dec. 12, 2008 Voluntary Amendment "A" for Canadian Patent Application 2,534,968.
CA Nov. 26, 2010 Examiner's Report issued for Canadian Patent Application 2,534,968.
CA May 26, 2011 Response to Examiner's Report for Nov. 26, 2010 for Canadian Patent Application 2,534,968.
CA Mar. 31, 2011 Voluntary Amendment "D" for Canadian Patent Application 2,534,978.
CA Jun. 6, 2011 Amendment "C" Response to Examiner's Report of Nov. 26, 2010 for Canadian Patent Application 2,534,968.
CA Dec. 19, 2011 Examiner's Report issued for Canadian Patent Application 2,534,968.
CA Feb. 13, 2012 Examiner's Report issued for Canadian Patent Application 2,534,978.
CA May 28, 2012 Amendment "D" to Examiner's Report issued Dec. 19, 2011 for Canadian Application 2,534,968.
CA Aug. 3, 2012 Response to Examiner's Report issued on Feb. 13, 2012 for Canadian Patent Application 2,534,978.
CN Jan. 12, 2007 Office Action issued for Chinese Patent Application 03820463.0.
CN Apr. 17, 2007 Response to Office Action for Chinese Patent Application 03820463.0.
CN Oct. 19, 2007 Office Action issued for Chinese Patent Application 03820463.0.
EA Oct. 20, 2005 Office Action issued for Eurasian Patent Application 200500412.
EA Nov. 25, 2005 Response to Office Action mailed Oct. 20, 2005 for Eurasian Application 200500412.
EA Sep. 28, 2006 Notification of Preparedness for Granting (Decision of Grant) issued for Eurasian Patent Application 200500513.

(56) References Cited

OTHER PUBLICATIONS

EP Sep. 7, 2007 Communication Pursuant to Article 96(2) issued for European Patent Application 03791891.9.
EP Oct. 30, 2008 Supplemental Search Report for European Patent Application 03755838.4.
EP Dec. 23, 2008 Response to Oct. 30, 2008 Communication for European Patent Application 03755838.4.
EP Jul. 29, 2010 Result of Consultation for European Patent Application 03755838.4.
EP Jan. 18, 2011 Response to Communication of Jul. 15, 2010 for European Patent Application 03755838.4.
EP May 27, 2011 Response to Communication of Jul. 15, 2010 for Euopean Patent Application 03755838.4.
EP Oct. 10, 2011 Summons to Attend Oral Proceedings for European Patent Application 03755838.4.
EP Jan. 4, 2012 Response to Oct. 10, 2011 Summons to Attend Oral Proceedings for European Patent Application 03755838.4.
EP Jan. 6, 2012 Supplemental Response to Oct. 10, 2010 Summons to Attend Oral Proceedings for European Patent Application 03755838.4.
EP Mar. 8, 2012 Decision to Refuse for European Patent Application 03755838.4.
EP Jul. 13, 2012 Statement of Grounds of Appeal for European Patent Application 03755838.4.
IN Feb. 12, 2007 Office Action for Indian Patent Application 773/DELNP/2005.
IN Apr. 13, 2007 Response to Office Action mailed Feb. 12, 2007 for Indian Patent Application 773/DELNP/2005.
PCT Feb. 27, 2004 International Search Report issued for International Application PCT/US03/28420.
PCT Apr. 30, 2004 International Search Report issued for International Application PCT/US03/28727.
PCT May 13, 2004 International Written Opinion issued for International Application PCT/US03/28420.
PCT Sep. 17, 2004 International Written Opinion issued for International Application PCT/US2003/028727.
PCT Nov. 17, 2004 Response to Written Opinion for International Application PCT/US03/28727.
PCT Dec. 9, 2004 International Preliminary Examination Report issued for International Application PCT/US03/028420.
PCT Jan. 10, 2005 International Preliminary Examination Report issued for International Application PCT/US03/26950.
PCT Feb. 18, 2005 International Preliminary Examination Report issued for International Application PCT/US03/28420.
PCT May 5, 2005 International Written Opinion issued for International Application PCT/US03/29375.
PCT Jun. 3, 2005 Response to Written Opinion issued for International Application PCT/US03/29375.
PCT Aug. 4, 2005 International Preliminary Examination Report issued for International Application PCT/US2003/029375.
PCT Sep. 2, 2005 International Preliminary Examination Report issued for International Application PCT/US03/29375.
PCT Jun. 27, 2011 International Search Report issued for International Application PCT/US2011/000575.
PCT Oct. 23, 2012 International Preliminary Report on Patentability issued for International Application PCT/US2011/000575.
Jan. 7, 2004 Office Action/Non-Final Rejection mailed for U.S. Appl. No. 10/247,441, filed Sep. 19, 2002.
Jul. 7, 2004 Response to Office Action mailed Jan. 7, 2004 for U.S. Appl. No. 10/247,441, filed Sep. 19, 2002.
Dec. 7, 2004 Office Action mailed for U.S. Appl. No. 10/664,737, filed Sep. 18, 2003.
Dec. 22, 2004 Office Action/Final Rejection mailed for U.S. Appl. No. 10/247,441, filed Sep. 19, 2002.
Feb. 22, 2005 Response to Office Action/Final Rejection mailed Dec. 22, 2004 for U.S. Appl. No. 10/247,441, filed Sep. 19, 2002.
Mar. 2, 2005 Response to Office Action mailed Dec. 7, 2004 for U.S. Appl. No. 10/664,737, filed Sep. 18, 2003.
Mar. 16, 2005 Notice of Allowability mailed for U.S. Appl. No. 10/247,441, filed Sep. 19, 2002.
Apr. 14, 2005 Response to Office Action/Non-Compliant Amendment mailed Mar. 14, 2005 for U.S. Appl. No. 10/664,737, filed Sep. 18, 2003.
May 19, 2005 Office Action mailed for U.S. Appl. No. 10/244,980, filed Sep. 17, 2002.
Jun. 8, 2005 Office Action/Final Rejection mailed for U.S. Appl. No. 10/664,737, filed Sep. 18, 2003.
Aug. 19, 2005 Examiner's Interview Summary mailed for U.S. Appl. 10/664,737, filed Sep. 18, 2003.
Sep. 7, 2005 Response to Office Action/Final Rejection mailed Jun. 8, 2005 for U.S. Appl. No. 10/664,737, filed Sep. 18, 2003.
Oct. 28, 2005 Response to Office Action and Request for Reconsideration of Restriction Requirement mailed Sep. 30, 2005 for U.S. Appl. No. 10/229,626, filed Aug. 28, 2002.
Dec. 5, 2005 Advisory Action for U.S. Appl. No. 10/664,737, filed Sep. 18, 2003.
Dec. 8, 2005 Response to Office Action and Request for Continued Examination for U.S. Appl. No. 10/664,737, filed Sep. 18, 2003.
Jan. 10, 2006 Office Action mailed for U.S. Appl. No. 10/244,980, filed Sep. 17, 2002.
Feb. 13, 2006 Notice of Allowability mailed for U.S. Appl. No. 10/664,737, filed Sep. 18, 2003.
Jun. 20, 2006 Notice of Allowability mailed for U.S. Appl. No. 10/664,737, filed Sep. 18, 2003.
Jun. 20, 2006 Response to Office Action mailed Jan. 11, 2006 for U.S. Appl. No. 10/229,626, filed Aug. 28, 2002.
Nov. 20, 2006 Office Action mailed for U.S. Appl. No. 11/128,656.
Jan. 5, 2007 Notice of Allowability mailed for U.S. Appl. No. 10/244,980, filed Sep. 17, 2002.
Feb. 28, 2007 Response to Office Action/Final Rejection for U.S. Appl. No. 10/229,626, filed Feb. 28, 2002.
Mar. 21, 2007 Response to Office Action mailed Nov. 20, 2006 for U.S. Appl. No. 11/128,656, filed May 5, 2013.
Apr. 12, 2007 Response to Advisory Action mailed Nov. 17, 2006 for U.S. Appl. No. 10/229,626.
Jun. 7, 2007 Office Action mailed for U.S. Appl. No. 11/128,656, filed May 13, 2005.
Sep. 13, 2007 Examiner Interview Summary for U.S. Appl. No. 10/229,626, filed Aug. 28, 2002.
Sep. 17, 2007 Response to Office Action/Non-Final Rejection mailed Jul. 6, 2007 for U.S. Appl. No. 10/229,626, filed Aug. 28, 2002.
Jan. 8, 2008 Examiner Interview Summary for U.S. Appl. No. 10/229,626, filed Aug. 28, 2002.
Feb. 19, 2008 Response to Office Action/Non-Final Rejection mailed Jun. 7, 2007 for U.S. Appl. No. 11/128,656, filed May 13, 2005.
Jun. 5, 2008 Response to Office Action/Final Rejection mailed Dec. 6, 2007/Request for Continued Examination for U.S. Appl. No. 10/229,626, filed Aug. 28, 2002.
Jul. 17, 2008 Office Action mailed for U.S. Appl. No. 11/128,656, filed May 13, 2005.
Nov. 26, 2008 Response to Office Action mailed Jul. 17, 2008 for U.S. Appl. No. 11/128,656, filed May 13, 2005.
Mar. 3, 2009 Office Action mailed for U.S. Appl. No. 11/128,656, filed May 13, 2005.
May 12, 2009 Response to Office Action/Non-Final Rejection mailed Mar. 3, 2009 for U.S. Appl. No. 11/128,656, filed May 13, 2005.
May 19, 2009 Response to Office Action mailed Mar. 17, 2009 for U.S. Appl. No. 10/229,626, filed Aug. 28, 2002.
Jun. 11, 2009 Advisory Action mailed for U.S. Appl. No. 10/229,626, filed Aug. 28, 2002.
Jul. 13, 2009 Response to Office Action mailed Mar. 17, 2009 for U.S. Appl. No. 10/229,626, filed Aug. 28, 2002.
Jul. 30, 2009 Notice of Allowability mailed for U.S. Appl. No. 11/128,656, filed May 13. 2005.
Aug. 31, 2009 Response to Office Action mailed Aug. 4, 2009 for U.S. Appl. No. 11/581,235, filed Oct. 11, 2006.
Dec. 14, 2009 Office Action/Final Rejection mailed for U.S. Appl. No. 11/581,235, filed Oct. 11, 2006.
Dec. 17, 2009 Response to Office Action/Final Rejection mailed Dec. 14, 2009 for U.S. Appl. No. 11/581,235, filed Oct. 11, 2006.
Jan. 12, 2010 Notice of Allowability mailed for U.S. Appl. No. 11/581,235, filed Oct. 11, 2006.

(56) References Cited

OTHER PUBLICATIONS

Mar. 1, 2010 Examiner's Interview Summary mailed for U.S. Appl. No. 10/229,626, filed Aug. 28, 2002.
Mar. 2, 2010 Response to Office Action mailed Oct. 5, 2009 for U.S. Appl. No. 10/229,626, filed Aug. 28, 2002.
Mar. 5, 2010 Office Action/Non-Final Rejection mailed for U.S. Appl. No. 11/805,109, filed May 22, 2007.
Mar. 18, 2010 Preliminary Amendment for U.S. Appl. No. 12/583,815, filed Aug. 26, 2009.
Jun. 1, 2010 Response to Office Action/Non-Final Rejection mailed Mar. 5, 2010 for U.S. Appl. No. 11/805,109, filed May 22, 2007.
Jun. 10, 2010 Office Action mailed for U.S. Appl. No. 12/462,563, filed Aug. 5, 2009.
Jun. 21, 2010 Notice of Allowability mailed for U.S. Appl. No. 10/229,626, filed Aug. 28, 2002.
Nov. 2, 2010 Response to Office Action/Non-Final Rejection mailed Aug. 5, 2010 / Request for Continued Examination for U.S. Appl. No. 11/805,109, filed May 22, 2007.
Nov. 18, 2010 Response to Office Action/Non-Final Rejection mailed Jun. 10, 2010 for U.S. Appl. No. 12/462,563, filed Aug. 5, 2009.
Dec. 13, 2010 Notice of Allowability mailed for U.S. Appl. No. 12/462,563, filed Aug. 5, 2009.
Jan. 10, 2011 Notice of Allowability mailed for U.S. Appl. No. 11/805,109, filed May 22, 2007.
Aug. 27, 2012 Notice of Allowability mailed for U.S. Appl. No. 11/805,109, filed May 22, 2007.
Sep. 6, 2012 Office Action mailed for U.S. Appl. No. 12/798,899, filed Apr. 13, 2010.
Feb. 27, 2013 Response to Office Action mailed Sep. 6, 2012 for U.S. Appl. 12/798,899, filed Apr. 13, 2010.
Feb. 27, 2013 Notice of Allowability mailed for U.S. Appl. No. 12/583,815, filed Aug. 26, 2009.
Apr. 1, 2013 Notice of Allowability mailed for U.S. Appl. No. 12/798,899, filed Apr. 13, 2010.
CA May 27, 2013 Examiner's Report mailed for Canadian Patent Application 2,534,978.
CA Nov. 26, 2011 Response to Examiner's Report mailed for Canadian Patent Application 2,534,978.
Burt, Peter J. and Edward H. Adelson, "A Multiresolution Spline with Application to Image Mosiacs" ACM Transactions on Graphics, vol. 2, No. 4, Oct. 1983, pp. 217-236.
PCT Jan. 7, 2014 International Search Report and Written Opinion issued for International Application No. PCT/US2013/052278.
Dec. 19, 2008 Response to Office Action/Non-Final Rejection mailed Aug. 20, 2008 for U.S. Appl. No. 10/229,626, filed on Aug. 28, 2002.
Oct. 18, 2005 Response to Office Action mailed May 19, 2005 for U.S. Appl. No. 10/244,980, filed Sep. 17, 2002.
Apr. 11, 2006 Response to Office Action mailed Jan. 10, 2006 for U.S. Appl. No. 10/244,980, filed Sep. 17, 2002.
Jul. 13, 2006 Office Action/Non-Final Rejection mailed for U.S. Appl. No. 10/244,980, filed Sep. 17, 2002.
Nov. 10, 2006 Response to Office Action/Non-Final Rejection mailed Jul. 13, 2006 for U.S. Appl. No. 10/244,980, filed Sep. 17, 2002.
Nov. 20, 2006 Examiner's Interview Summary Record for U.S. Appl. No. 10/244,980, filed Sep. 17, 2002.
Aug. 4, 2009 Office Action/Non-Final Rejection mailed for U.S. Appl. No. 11/581,235, filed Oct. 11, 2006.
Apr. 1, 2013 Notice of Allowance/Allowability for U.S. Appl. No. 12/798,899, filed Apr. 13, 2010.
EP Jun. 11, 2013 Response to EPO communication under Rules 161(2) and 162 EPC dated Dec. 6, 2012, with amended claims, filed in European Patent Application EP11862219.0.
Printout of Optech's "ALTM System Components" webpage, dated May 1, 2002.
Printout of Optech's "ALTM Specifications" webpages, dated May 1, 2002.
Printout of Optech's "How ALTMs Work" webpage, dated May 1, 2002.
Printout of Optech's "ALTM Products" webpages, dated May 1, 2002.
Printout of Optech's "ALTM REALM Software" webpage, dated May 1, 2002.
Printout of Optech's "ALTM Survey Operation" webpages, dated May 1, 2002.
Press Release, Houston Company to provide before and after photography of hurricane path on web, dated Aug. 27, 1998.
VISI Air DAVe web page, archived on Feb. 21, 1999.
Brochure, Visual Intelligence Products and Services, dated Aug. 14, 1999.
Brochure, Visual Intelligence Products and Services, dated Oct. 21, 1999.
Press Release, AirRECON III delivers substantial cost and time savings to Enron subsidiary by integrating Visual Intelligence's proprietary class location software with its seamless color, rectified digitally collected photography, dated Jan. 10, 2000.
Brochure, Limited Time Special, dated Feb. 1, 2000.
Abstract, Inexpensive 6-inch resolute, digital ortho-imagery with sub-meter accuracy, dated Apr. 13, 2000.
AirRECON III—The 3rd Generation micropixel digital color aerial photo system, as published on VISI website, archived by the Wayback Machine on Oct. 28, 2000.
Brochure, With Visual Intelligence's high resolution, fast delivery and low cost, you get better alignment sheets and more accurate census counts, dated Aug. 30, 2000.
Brochure, Visual Intelligence Systems, Inc. 15-cm color orthophotography 480 band, .5-m hyperspectral 15-cm LIDAR, dated Feb. 7, 2001.
Brochure, Real-Time Disaster Assessment System, dated Oct. 13, 2001.
Brochure, Real-Time Disaster Assessment System, dated Jun. 6, 2002.
Al-Bayari et al., Quality Assessment of DTM and Orthophoto Generated by Airborne Laser Scanning System Using Automated Digital Photogrammetry, Commission III, PCV Symposium 2002.
E.P. Baltsavias, Airborne laser scanning: existing systems and firms and other resources, ISPRS Journal of Photogrammetry & Remote Sensing 54 (1999), pp. 164-198.
Berg and Ferguson, Airborne Laser Mapping for Highway Engineering Applications, Proceedings of the ASPRS Annual Convention, St. Louis, USA. (2001).
Brown et al., Inertial Instrument System for Aerial Surveying, U.S. Geological Survey Professional Paper 1390 (1987).
Ellis and Dodd, Applications and Lessons Learned with Airborne Multispectral Imaging, Fourteenth International Conference on Applied Geologic Remote Sensing, Las Vegas, Nevada, Nov. 6-8, 2000.
Ellum and El-Sheimy, Land-Based Mobile Mapping Systems, Photogrammetric Engineering & Remote Sensing Jan. 2002, pp. 13-28.
Haala et al., On the Use of Multispectral and Stereo Data From Airborne Scanning Systems for DTM Generation and Landuse Classification, IAPRS vol. 32/4, ISPRS Comm. IV Symposium on GIS—Between Visions and Applications (1998).
Haala et al., Calibration of Directly Measured Position and Attitude by Aerotriangulation of Three-Line Airborne Imagery, Commission III, Working Group 1 (2000).
Haala et al., On the Performance of Digital Airborne Pushbroom Cameras for Photogrammetric Data Processing—A Case Study, IAPRS vol. XXXIII (ISPRS Congress, Amsterdam 2000).
Hess et al., Geocoded digital videography for validation of land cover mapping in the Amazon Basin, International Journal of Remote Sensing, vol. 23, Issue 7, Feb. 2002.
Ip, Analysis of Integrated Sensor Orientation for Aerial Mapping, UCGE Reports No. 20204, Jan. 2005.
IP et al., System Performance Analysis of INS/DGPS Integrated System for Mobile Mapping System (MMS), Commission VI, WG VI/4 (2004).
Jacobsen, Potential and Limitation of Direct Sensor Orientation, IAPRS vol. XXXIII, Part B3, pp. 429-435 (ISPRS Congress, Amsterdam 2000).

(56) References Cited

OTHER PUBLICATIONS

Jacobsen, Calibration Aspects in Direct Georeferencing of Frame Imagery, ISPRS Commission I/FIEOS 2002 Conference Proceedings.
Kocaman, GPS and INS Integration with Kalman Filtering for Direct Georeferencing of Airborne Imagery, Geodetic Seminar Report, Institute of Geodesy and Photogrammetry, Jan. 30, 2003.
Leberl et al., Novel Concepts for Aerial Digital Cameras, ISPRS Commission I Symposium, Denver, Colorado, Nov. 2002.
Lutes, DAIS: A Digital Airborne Imaging System, ISPRS Commission I/FIEOS 2002 Conference Proceedings, Nov. 2002.
Mann and Chiarito, Technologies for Positioning and Placement of Underwater Structures, prepared for U.S. Army Corps of Engineers, ERDC TR- INP-00-1, Mar. 2000.
Petrie, Déjà Vu—The Configurations of the New Airborne Digital Imagers Are All Rooted in the Distant Past!, GeoInformatics, Jul./Aug. 2000.
Petrie, Further Advances in Airborne Digital Imaging: Several New Imagers Introduced at ASPRS, GeoInformatics, Jul./Aug. 2006.
Pollock, Development of a Highly Automated System for the Remote Evaluation of Individual Tree Parameters, Integrated Tools Proceedings, Boise, Idaho, Aug. 16-20, 1998, pp. 638-645.
Savopol et al., A Digital Multi CCD Camera System for Near Real-Time Mapping, IAPRS vol. XXXIII, Part B1, pp. 266-271 (ISPRS Congress, Amsterdam 2000).
Schenk and Csatho, Fusion of LIDAR data and aerial imagery for a more complete surface description, International Archives of Photogrammetry Remote Sensing and Spatial Information Sciences 34.3/A (2002), pp. 310-317.
Schultz et al., Integrating Small Format Aerial Photography, Videography, and a Laser Profiler for Environmental Monitoring, ISPRS Comm. II, WG 1 Workshop on Integrated Sensor Calibration and Orientation (1999).
Talaya et al., Integration of a terrestrial laser scanner with GPS/IMU orientation sensors, Proceedings of the XXth ISPRS Congress, vol. 35 (2004).
Tempelmann, Udo, et al., Photogrammetric software for the LH Systems ADS40 airborne digital sensor, IAPRS, vol. XXXIII, Part B2, pp. 552-559 (ISPRS Congress, Amsterdam 2000).
Hinsken, L. et al., Triangulation of LH Systems' ADS40 imagery using Orima GPS/IMU, IAPRS 34.3/A (2002), pp. 156-162.
Sandau, Rainer, et al., Design principles of the LH Systems ADS40 airborne digital sensor, IAPRS vol. XXXIII, Part B1, pp. 258-265 (ISPRS Congress, Amsterdam 2000).
Roeser et al., New Potential and Application of ADS, IAPRS vol. XXXIII, Part B1, pp. 251-257 (ISPRS Congress, Amsterdam 2000).
Leica Press Release, Leica ADS40 to Make American Debut Apr. 12, 2002, Apr. 12, 2002.
Santmire, Technology Changing View for Aerial Photography Pros, Houston Business Journal, Jul. 2, 2000.
Bossler and Schmidley, Airborne Integrated Mapping System (AIMS): Recent Results in Applications for Large-Scale Mapping, URISA 1997 Annual Conference Proceedings, Toronto, Canada, Jul. 1997.
Grejner-Brzezinska, Direct Exterior Orientation of Airborne Imagery with GPS/INS System: Performance Analysis, Navigation, vol. 46, No. 4, pp. 261-270 (1999).
Grejner-Brzezinska, D., and B. Phuyal, Positioning accuracy of the airborne integrated mapping system, Proceedings of the 1998 National Technical Meeting of The Institute of Navigation, Long Beach, CA, Jan. 1998, pp. 713-721.
Grejner-Brzezinska and Wang, Gravity Modeling for High-Accuracy GPS/INS Integration, Navigation, 45(3) (1998), pp. 209-220.
Grejner-Brzezinska, Direct Sensor Orientation in Airborne and Land-based Mapping Applications, Report No. 461, Geodetic GeoInformation Science, Dept. of Civil and Environmental Engineering and Geodetic Science, Jun. 2001.
Grejner-Brzezinska et al., Multi-Sensor Systems for Land-Based and Airborne Mapping: Technology of the Future?, IAPRS vol. XXXIV, Part 2, Comm. II, pp. 31-42 (Xi'an, Aug. 20-23, 2002).
Li et al., Object Recognition from AIMS Data Using Neural Networks, Report No. 462, Geodetic and GeoInformation Science, Dept. of Civil and Environmental Engineering and Geodetic Science, Dec. 1998.
Toth, Direct Platform Orientation of MultiSensor Data Acquisition Systems, IAPRS vol. 32/4, ISPRS Commission IV Symposium on GIS-Between Visions and Applications, pp. 629-634 (Stuttgart, Germany 1998).
Toth, Experiences with frame CCD arrays and direct georeferencing, Photogrammetric Week '99, pp. 95-109 (1999).
Toth, Calibrating Airborne LIDAR Systems, IAPRS vol. XXXIV, Part 2, Comm. II, pp. 475-480 (Xi'an, Aug. 20-23, 2002).
Toth, Charles K., and Dorota A. Grejner-Brzezinska, Performance analysis of the airborne integrated mapping system (AIMS), IAPRS 32 (1997), pp. 320-326, available at https://www.cfm.ohio-state.edu/research/AIMS/paper3.htm.
Toth, Charles, and D. Grejner-Brzezinska, DEM Extraction from High-Resolution Direct-Digital Airborne Imagery, ISPRS Commission III Symposium on Object Recognition and Scene Classification from Multispectral and Multisensor Pixels, IAPRS vol. XXXII, Part 3/1, pp. 184-189 (1998).
Toth, C., and Dorota A. Grejner-Brzezinska, Complementarity of LIDAR and stereo imagery for enhanced surface extraction, IAPRS vol. XXXIII, Part B3/2, pp. 897-904 (ISPRS Congress, Amsterdam 2000).
Lithopoulos, E., Blake Reid, and Bruno Scherzinger, The position and orientation system (POS) for survey applications, IAPRS 31 (1996), pp. 467-471.
Mostafa, et al., A fully digital system for airborne mapping, Proceedings of The International Symposium on Geodesy, Geomatics, and Navigation—KIS 1997, Banff, Canada, Jun. 3-6, 1997, pp. 463-471.
Mostafa et al., Ground Accuracy from Directly Georeferenced Imagery, GIM International, vol. 14, No. 12, Dec. 2000.
Mostafa and Schwarz, Multi-Sensor System for Airborne Image Capture and Georeferencing, Photogrammetric Engineering & Remote Sensing, vol. 66, No. 12, Dec. 2000, pp. 1417-1423.
Mostafa, Airborne Image Georeferencing by GPS-aided Inertial Systems: Concepts and Performance Analysis, 22nd Asian Conf. on Remote Sensing, Nov. 5-9, 2001.
Mostafa, Boresight Calibration of Integrated Inertial/Camera Systems, Proceedings of The International Symposium on Kinematic Systems in Geodesy, Geomatics and Navigation—KIS 2001, Banff, Canada, Jun. 5-8, 2001, pp. 440-445.
Mostafa and Hutton, Direct Positioning and Orientation Systems: How Do They Work? What is the Attainable Accuracy?, Proceedings, American Society of Photogrammetry and Remote Sensing Annual Meeting, St. Louis, MO, USA, Apr. 24-27, 2001.
Mostafa and Schwarz, The Development and Testing of an Integrated GPS/SINS/Multi-Camera System for Airborne Mapping, The 3rd International Symposium on Mobile Mapping Technology, Cairo, Egypt, Jan. 3-5, 2001.
Mostafa et al., Airborne Direct Georeferencing of Frame Imagery: An Error Budget, The 3rd International Symposium on Mobile Mapping Technology, Cairo, Egypt, Jan. 3-5, 2001.
Diener et al., Radiometric Normalisation and Colour Composite Generation of the DMC, IAPRS vol. XXXIII, Part B1, pp. 83-88 (ISPRS Congress, Amsterdam 2000).
Digital Mapping Camera Brochure (2002).
Heier, Deploying DMC in today's workflow, Photogrammetric Week 2001, pp. 35-45.
Heier, Helmut, and Alexander Hinz, A digital airborne camera system for photogrammetry and thematic applications, ISPRS Joint Workshop on Sensors and Mapping from Space, Hanover, Germany, Sep. 27-30, 1999.
Hinz, The Z/I Imaging Digital Aerial Camera System, Photogrammetric Week '99, pp. 109-115 (1999).
Hinz et al., Digital Modular Camera: System Concept and Data Processing Workflow, IAPRS vol. XXXIII, Part B2, pp. 164-171 (ISPRS Congress, Amsterdam 2000).
Hinz et al., DMC—The Digital Sensor Technology of Z/I-Imaging, Photogrammetric Week '01, pp. 93-103 (2001).

(56) References Cited

OTHER PUBLICATIONS

Tang et al., Geometric Accuracy Potential of the Digital Modular Camera, IAPRS vol. XXXIII, Part B4, pp. 1051-1057 (ISPRS Congress, Amsterdam 2000).
Zeitler and Doerstel, Geometric Calibration of the DMC: Method and Results, Pecora 15/Land Satellite Information IV/ISPRS Commission I/FIEOS 2002 Conference Proceedings (2002).
Mohamed, Navigating the Ground from Air: Active Monitoring with GPS/INS Geo-referenced LiDAR, Proceedings of the 2003 National Technical Meeting of The Institute of Navigation, Anaheim, CA, Jan. 2003, pp. 593-601.
Mohamed, Advancements in the Development of DORIS, Photogrammatic Week '01, pp. 1-11 (2001).
Mohamed and Price, Near the Speed of Flight: Aerial Mapping with GPS/INS Direct Georeferencing, GPS World, Mar. 2002, pp. 40-45.
Mohamed et al., The Development of DORIS: An Overview, 3rd International Symposium on Mobile Mapping Technology, Cairo-Egypt, Jan. 3-5, 2001.
Guangping He, Design of a Mobile Mapping System for GIS Data Collection, IAPRS vol. XXXI, Part B2 (Vienna 1996), pp. 154-159.
Guangping He, Design and Application of the GPSVision Mobile Mapping System, IAPRS vol. XXXIV, Part 2, Comm. II (Xi'an Aug. 20-23, 2002), pp. 163-168.
He and Orvets, Capturing Road Network Using Mobile Mapping Technology, IAPRS vol. XXXIII, Part B2, pp. 272-277 (ISPRS Congress, Amsterdam 2000).
He, Guangping, Kurt Novak, and Wenhao Feng, On the integrated calibration of a digital stereo-vision system, IAPRS vol. XXIX, Part B5, pp. 139-145 (Washington, D.C., Aug. 2-14, 1992).
Grejner-Brzezinska and Toth, Precision Mapping of Highway Linear Features, IAPRS, vol. XXXIII, Part B2, pp. 233-240 (2000).
Grejner-Brzezinska, D. A., Direct georeferencing at the Ohio State University: A historical perspective, Photogrammetric Engineering and Remote Sensing Journal of The American Society for Photogrammetry and Remote Sensing, vol. 68, No. 6 (Jun. 2002), pp. 557-560.
Graefe et al., The road data acquisition system MoSES—determination and accuracy of trajectory data gained with the Applanix POS/LV, Proceedings of 3rd International Symposium on Mobile Mapping Technology, Jan. 2001.
Graefe, Quality Management in Kinematic Laser Scanning Applications (2007).
Optech ALTM Brochure (Aug. 1994).
Okubo, Airborne Laser Measurement Technology in Japan, Proceedings of FIG Working Week 2001, Seoul, Korea, May 6-11, 2001.
Press Release, EnerQuest Systems Announces LIDAR Point Classification Technology Sep. 16, 2002, Sep. 16, 2002.
Mietz et al., An Evaluation of LIDAR Vertical Accuracy in Grand Canyon, Arizona, Jul. 2002, pp. 1-15.
Press Release, EnerQuest Wins Contract for LIDAR Mapping of Grand Canyon, Oct. 4, 2000.
Cascade Siskiyou National Monument Hyperspectral Imagery / LIDAR Project Final Report, Oct. 23, 2002.
Beard et al, The Ultracam Camera Control and Data Acquisition System, in Advanced Telescope and Instrumentation Control Software II, Lewis, H., SPIE 4848, Astronomical Telescopes and Instrumentation, Waikoloa 2002.
Leberl and Gruber, Flying the New Large Format Digital Aerial Camera Ultracam, Photogrammetric Week '03, D. Fritsch, Ed., Wichmann-Verlag, Heidelberg, pp. 67-76 (2003).
Leberl et al., The Ultracam Large Format Aerial Digital Camera System, Proceedings of the American Society for Photogrammetry & Remote Sensing, Anchorage, Alaska, May 5-9, 2003, pp. 1-6.
EI-Sheimy, A Mobile Multi-Sensor System for GIS Applications in Urban Centers, IAPRS vol. XXXI, Part B2, ISPRS Comm. II, pp. 95-100 (Vienna, Jul. 9-19, 1996).
Tao, Automated Approaches to Object Measurement and Feature Extraction from Georeferenced Mobile Mapping Image Sequences, Ph.D Dissertation (Dept. of Geomatics Engineering, Calgary, Alberta) (Oct. 1997).
Tao, Innovations on Multi-Sensor and Multi-Platform Integrated Data Acquisition (1999).
Tao, Mobile Mapping Technology for Road Network Data Acquisition, Journal of Geospatial Engineering, vol. 2, No. 2, pp. 1-13 (2000).
Alamus and Talaya, Airborne Sensor Integration and Direct Orientation of the CASI System, IAPRS vol. XXXIII, Part B1, pp. 5-11 (ISPRS Congress, Amsterdam 2000).
Allan and Holland, Digital Photogrammetry, Developments at Ordnance Survey, IAPRS vol. XXXIII, Part B2, pp. 46-51 (ISPRS Congress, Amsterdam 2000).
Hill et al., Wide-Area Topographic Mapping and Applications Using Airborne Light Detection and Ranging (LIDAR) Technology, Photogrammetric Engineering & Remote Sensing, Aug. 2000, pp. 908-914.
Louis, John, et al., Operational use and calibration of airborne video imagery for agricultural and environmental land management applications, Proceedings of the 15th Biennial Workshop on Color Photography and Air Videography (1995).
Pendleton, Map Compilation from Aerial Photographs, USGS Bulletin: 788-F (1928), pp. 379-432.
Petrie, ISPRS 2000 Technical Exhibition, Geoinformatics Oct./Nov. 2000, pp. 30-35.
Petrie, Optical Imagery from Airborne & Spaceborne Platforms: Comparisons of Resolution, Coverage, & Geometry for a Given Ground Pixel Size, Geoinformatics, Jan./Feb. 2002, pp. 28-35.
Renslow et al, Evaluation of Multi-Return LIDAR for Forestry Applications, RSAC—2060/4810-LSP-0001-RPT1, Nov. 2000.
Sun et al., Spatial Resolution Enhancement and Dynamic Range Extending of a Computerized Airborne Multicamera Imaging System, in Sensor Fusion: Architectures, Algorithms and Applications IV, Belur V. Dasarathy (Ed.), Proceedings of SPIE vol. 4051 (2000), pp. 118-125.
ASPRS Camera Calibration Panel Report, sponsored by U.S. Geological Survey, Jan. 2000.
LIDAR for Hire, Point of Beginning Magazine, Jan. 26, 2001.
3Di Press Release, 3Di Acquires Eagle Scan; Spatial Data Technology Firm Enhances Digital Photography and LIDAR Mapping with Eagle Scan Acquisition, May 9, 2000.
Jul. 9, 2014 Supplementary European Search Report and Written Opinion mailed in European Patent Application EP11862219.0.
Hagolle, et al., *How to double the spatial resolution of a push-broom instrument*, Geoscience and Remote Sensing Symposium, 1994. IGARSS '94. Surface and Atmospheric Remote Sensing: Technologies, Data analysis and Interpretation., International, Pasadena, CA, USA (Aug. 8-12, 1994), New York, NY, USA, IEEE, vol. 3 (Aug. 8, 1994), 1553-1555.

* cited by examiner

RETINAL CONCAVE ARRAY COMPOUND CAMERA SYSTEM

CROSS-REFERENCE TO RELATED APPLICATION

This application is a divisional of prior U.S. application Ser. No. 10/229,626 filed on Aug. 28, 2002 now U.S. Pat. No. 7,893,957.

TECHNICAL FIELD OF THE INVENTION

The present invention relates, generally, to the field of remote imaging techniques and, more particularly, to an imaging system providing high-resolution digital imaging over very large fields of view.

BACKGROUND OF THE INVENTION

Remote imaging is a broad-based technology having a number of diverse and extremely important practical applications—such as geological mapping and analysis, military surveillance and planning, and meteorological forecasting. Aerial and satellite-based photography and imaging are especially useful remote imaging techniques that have, over recent years, become heavily reliant on the collection and processing of digital image data. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various civilian and military applications (e.g., dynamic GPS mapping).

A major challenge facing some such remote imaging applications is one of image resolution. Certain applications require very high image resolution—often with tolerances of inches. Depending upon the particular system used (e.g., aircraft, satellite, or space vehicle), an actual digital imaging device may be located anywhere from several hundred feet to several miles above its target, resulting in a very large scale factor. Providing images with very large scale factors, that also have resolution tolerances of inches, poses a challenge to even the most robust imaging system.

Orthophotography is one approach that has been used in an attempt to address this problem. In general, orthophotography renders an image of a target by compiling varying images of the target. Typically, in aerial imaging applications, a digital imaging device that has a finite range and resolution records images of fixed subsections of a target area sequentially. Those images are then aligned according to sequence to render a composite of a target area. Usually, conventional systems must make some trade-off between resolution quality and the size of area that can be imaged. If the system is designed to provide high-resolution digital images, then the field of view (FOV) of the imaging device is typically small. Numerous imaging iterations must be performed in order to orthographically render an image of a large area. If the system provides a larger FOV, then usually the resolution of the digital image is decreased and the distortion is increased.

Some conventional digital imaging systems have attempted to address these issues with large-scale single lens cameras. These cameras typically comprise a very large primary optical lens, behind which a number of optical sensors are embedded. The characteristics of these configurations, especially the optical properties of the primary lens, tend to render images of very small cross sectional area. Generally, sensors in these systems have either identical or coinciding lines of sight. Such systems are generally inefficient when images with wide FOV are desired. Furthermore, such systems are usually very costly. Rapid development of new sensor technologies renders these systems obsolete or requires that the systems have cumbersome and costly upgrades or modifications.

Other conventional systems have attempted to address the shortcomings of such primary lens configurations through the use of divergent sensor arrays. Usually, optical sensors are outwardly mounted along a convex brace or housing such that their focal axes diverge outwardly from the imaging device. Based on the intended scale factor for the images, the individual sensors in the array can be disposed such that their focal planes adjoin or slightly overlap at a desired distance from the target area. Although such a configuration can provide a wider FOV for imaging, it is still limited in application. The sensor arrays must be mounted within a host aircraft or spacecraft, and thus require a portal in the craft through which to obtain image data. Large sensor arrays require large portals to provide proper optical access for all the diverging sensors in the array. In many cases, however, large portal spaces are impractical, if not impossible, to provide within the small confines of a host craft. Furthermore, larger portals allow a relatively high degree of light backscatter in the array, causing ghost images and degrading the overall quality and reliability of the images obtained.

There is, therefore, a need for an imaging system that provides efficient and versatile imaging for different FOVs, especially very large FOVs while maintaining image quality and clarity.

SUMMARY OF THE INVENTION

The present invention provides an imaging system having a compound array of imaging sensors disposed such that their focal axes converge, intersect, and thereafter diverge. Individual imaging sensors can be disposed within a housing or a host craft in a concave or retinal configuration, with non-coinciding lines of sight. Depending upon the configuration of the housing or host craft, a small aperture, portal or iris may be formed in the housing, and the array positioned in relation to the aperture, portal or iris, such that the point of intersection of the focal axes coincides with the aperture, portal or iris—the size of which can thus be minimized. Thus, a small aperture in the housing or craft may provide optical access to the target area for a large number of sensors. The individual sensors are disposed, and may be selectively adjusted, to have adjoining or overlapping lines of sight within the target area, resulting in a wide collective FOV of the target area. The imaging array of the present invention thus provides images with very little image distortion. The present invention further eliminates the need for cumbersome, expensive primary lenses.

In one embodiment, the present invention provides a remote imaging system for producing an image of a target that has a housing; a first imaging sensor, coupled to the housing having a first focal axis; and at least one secondary imaging sensor, coupled to the housing and offset from the first imaging sensor, each having a focal axis.

In one embodiment, the present invention provides a system for producing an image of a target viewed through an aperture. The system preferably comprises a housing, having preferably three or more imaging sensors coupled to the housing. Each imaging sensor produces a portion of the image. Each imaging sensor has a focal axis passing through the aperture, such that the focal axes of all imaging sensors intersect within an intersection area.

The present invention also provides a system for producing an image of a target viewed through an aperture that includes a housing, having a first imaging sensor centrally coupled to the housing. The first imaging sensor has a first focal axis passing through the aperture. A second imaging sensor is coupled to the housing and offset from the first imaging sensor along an axis, and has a second focal axis passing through the aperture and intersecting the first focal axis within an intersection area. A third imaging sensor is coupled to the housing and offset from the first imaging sensor along the axis, opposite the second imaging sensor. The third imaging sensor has a third focal axis passing through the aperture and intersecting the first focal axis within the intersection area.

The present invention also provides a method of producing a remote imaging array. A camera housing having a curvilinear housing axis is provided. A primary imaging sensor is coupled to the housing along the curvilinear housing axis, with the sensor's focal axis projecting outwardly from the housing. Secondary imaging sensors are coupled to the housing along the curvilinear housing axis on alternate sides of the primary imaging sensor, and aligned such that their focal axes intersect the focal axis of the primary sensor at an intersection area and their fields of view align with target areas opposite their respective positions in the housing.

In addition, the present invention provides a compound camera system that comprises a first support member, that is preferably concave, having an apex of curvature at its top. A second support member is angularly displaced with respect to the first support member. The second support member is adapted to intersect the apex of the first support member. A primary imaging sensor is centrally disposed along the concave surface of the first support member, having a primary focal axis projecting orthogonally from the first support member. A plurality of secondary imaging sensors are disposed along the concave surfaces of the first and second supports, at alternating angular intervals from the primary imaging sensor to create two arrays of sensors. The secondary imaging sensors are aligned such that their focal axes intersect with the primary focal axis in defined intersection area.

In an alternative embodiment of the invention, a remote imaging system for producing an image of a target is provided comprising a housing; an imaging sensor, coupled to the housing by electro-mechanically adjustable attachments; and an actuator that moves the imaging sensor to multiple imaging positions. In yet another alternative, a remote imaging system for producing an image of a target is provided with a housing; an imaging sensor, coupled to the housing; a moveably attached mirror system coordinated with the imaging sensor; and an actuator to move the mirror system to multiple positions to permit imaging of the terrain.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

The preferred embodiment of the present invention provides an imaging system having a compound array of imaging sensors disposed such that their focal axes converge, intersect, and thereafter diverge. Individual imaging sensors can be disposed within a host craft in a concave or retinal configuration, with non-coinciding lines of sight. Depending upon the configuration of the host craft, a small aperture, portal or iris may be formed in the craft, and the array positioned in relation to the aperture, portal or iris, such that the point of intersection of the focal axes coincides with the aperture, portal or iris—the size of which can thus be minimized. Thus, a small aperture in the craft may provide optical access to the target area for a large number of sensors. The individual sensors are disposed, and may be selectively adjusted, to have adjoining or overlapping lines of sight within the target area, resulting in a wide collective FOV of the target area. The imaging array of the present invention thus provides high-resolution images with very little image distortion. The present invention further eliminates the need for cumbersome, expensive primary lenses.

The present invention is applicable for use in a number of photographic and imaging applications, and is particularly applicable to aerial photography and imaging. Therefore, for purposes of explanation and illustration, the present invention is hereafter described within the context of an aerial imaging application. It should be understood, however, that those of skill in the art will, upon reference to this description, be able to apply the principles and teachings of the present invention in a wide variety of imaging systems—from personal digital cameras to manufacturing conveyor inspection systems, satellites and other spacecraft-based surveillance systems.

Figure 1A:
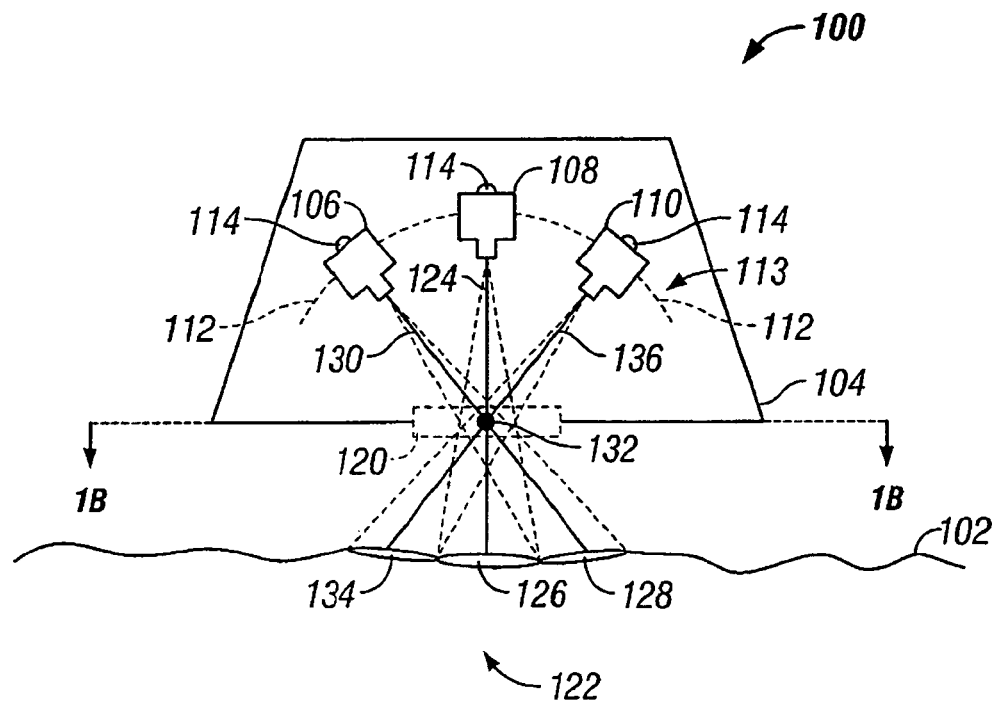
FIG. 1A illustrates a cross-sectional view of one embodiment of an imaging array according to the present invention.
Figure 1B:
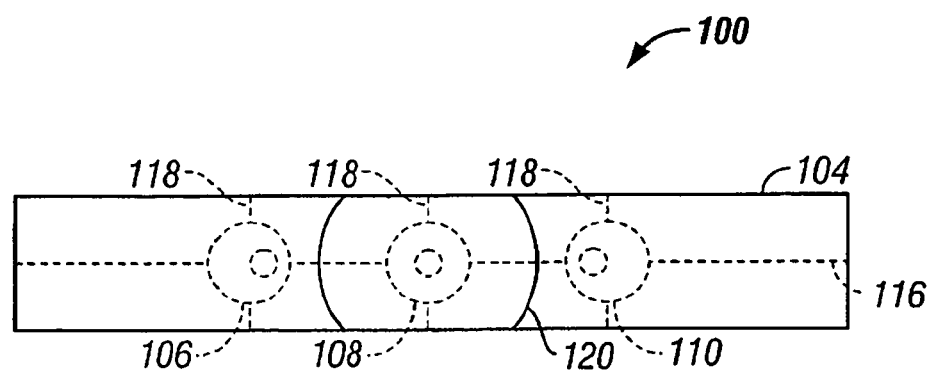
FIG. 1B is an illustration of a bottom view of the array of FIG. 1A, taken along line 1B-1B of FIG. 1A.

Referring now to FIGS. 1A and 1B, one embodiment of the present invention is provided as an illustrative example. FIG. 1A depicts a camera array assembly 100 airborne over target 102 (e.g., terrain). For illustrative purposes, the relative size of assembly 100, and the relative distance between it and terrain 102, are not depicted to scale in FIG. 1A. Assembly 100 comprises a housing 104 within which imaging sensors 106, 108, and 110 are disposed along a concave curvilinear array axis 112, forming an array 113. In all embodiments, the radius of curvature of array axis 112 may be altered dramatically, providing the ability to effect very subtle or very drastic degrees of concavity in axis 112. Alternatively, array axis 112 may be completely linear—having no curvature at all. Imaging sensors 106, 108, and 110 couple to housing 104, either directly or indirectly, by attachment members 114. Attachment members 114 may comprise a number of fixed or dynamic, permanent or temporary, connective apparatus. For example, members 114 may comprise simple welds, removable clamping devices, or electro-mechanically controlled universal joints.

As depicted in FIGS. 1A and 1B, housing 104 comprises a simple enclosure inside of which sensors 106, 108, and 110 are disposed. Sensors 106, 108, and 110 couple, via members 114, either collectively to a single transverse cross member 116, or individually to lateral cross members 118, disposed between opposing walls of housing 104. In alternative embodiments, housing 104 may itself comprise only a supporting cross member of concave curvature to which sensors 106, 108, and 110 couple, via members 114. In other embodiments, housing 104 may comprise a hybrid combination of enclosure and supporting cross member. In the preferred embodiment, housing 104 has an aperture 120 formed in its surface, between the sensors 106, 108, 110 and target 102. However, as mentioned above, the housing 104 structure may be varied significantly, including being a minimal structure that is open on the lower side, such that no aperture 120 is formed.

Depending upon the specific type of host craft, aperture 120 may comprise only a void, or it may comprise a protective screen or window to maintain environmental integrity within housing 104. Optionally, aperture 120 may comprise a lens or other optical device to enhance or alter the nature of the images recorded by the sensors. Aperture 120 is formed with a size and shape sufficient to provide sensors 106, 108, and 110 with proper lines of sight to a target region 122 on terrain 102.

Sensors 106, 108 and 110 are disposed within or along housing 104 such that the focal axes of all sensors converge and intersect each other within an intersection area 132 bounded by aperture 120. Depending upon the type of image data being collected, the specific sensors used, and other optics or equipment employed, it may be necessary or desirable to offset the intersection area 132 or point of convergence above or below aperture 120. Sensors 106, 108 and 110 are separated from each other at angular intervals, which are preferably equal. The exact angle of displacement between the sensors may vary widely depending upon the number of sensors utilized and on the type of imaging data being collected. In alternative embodiments, the angular displacement between sensors may be unequal—so as to provide a desired image offset or alignment. Depending upon the number of sensors utilized, and the particular configuration of the array 113, the focal axes 124, 130, 136 of all sensors may intersect at exactly the same point, or may intersect at a plurality of points, all within close proximity to each other and within the intersection area 132 defined by aperture 120. As the number of sensors and the ruggedness of the environment in which assembly 100 is employed increase, the precise alignment necessary to yield only a single intersection point 132 may be very difficult, if not impossible, to maintain. It is not necessary to maintain a single intersection point, as long as all axes converge and intersect in close proximity to one another such that the size and shape of aperture 120 need not be altered to provide a proper line of sight to the sensors 106, 108, 110.

As depicted in FIG. 1A, sensor 108 is centrally disposed within housing 104 along array axis 112. Sensor 108 has a focal axis 124, directed orthogonally from housing 104 to align the sensor's line of sight with image area 126 of region 122. Sensor 106 is disposed within housing 104 along array axis 112, adjacent to sensor 108. Sensor 106 is aligned such that its line of sight coincides with image area 128 of region 122, and such that its focal axis 130 converges with and intersects axis 124 at intersection point 132. Sensor 110 is disposed within housing 104 adjacent to sensor 108, on the opposite side of array axis 112 from sensor 106. Sensor 108 is aligned such that its line of sight coincides with image area 134 of region 122, and such that its focal axis 136 converges with and intersects axes 124 and 130 at intersection point 132. Sensors 106, 108 and 110, a well as subsequently described sensors, may comprise a number of imaging devices including individual cameras, infrared sensors, seismic sensors, photo detectors and photocells. Further, the infrared sensors may be multispectral or hyperspectral. Each sensor may comprise an individual imaging device, or a group of sensors. Sensors 106, 108 and 110 are preferably of a homogenous nature, but may comprise a combination of varied imaging devices.

From point 132, axes 124, 130 and 136 diverge. Thus, sensors 106 and 110 are alternately disposed within housing 104 along array axis 112 such that each sensor's focal axis converges upon point 132, crosses focal axis 124, and aligns its field of view with a target area opposite its respective position in the array 113—resulting in a "cross-eyed", retinal relationship between the sensors and the imaging target(s). If members 114 are of a permanent and fixed nature (e.g., welds), then the spatial relationship between aperture 120, the sensors, and their lines of sight remain fixed—as will the spatial relationship between image areas 126, 128 and 134. Such a configuration may be desirable in, for example, a satellite surveillance application where assembly 100 will remain at an essentially fixed distance from region 122. The position and alignment of the sensors is set such that areas 126, 128 and 134 provide full imaging coverage of region 122.

In other applications, however, it may be desirable to selectively adjust, either manually or by remote automation, the position or alignment of the sensors so as to shift, narrow or widen areas 126, 128 and 134, and thereby enhance or alter the images collected by assembly 100. One such embodiment is illustrated now by reference to FIG. 2.

An airborne imaging system 200 is depicted, and comprises an array assembly 100 in addition to a flight control system 202, a camera control system 204, and an image processing system 206. System 206 receives imaging data from the imaging sensors within assembly 100 via communicative links 208. Links 208 may comprise direct, physical connectors (e.g., wires, cables) between assembly 100 and system 206, or they may comprise communications connections (e.g., wireless transceivers). System 206 may be located within the same host craft (e.g., airplane) as assembly 100, or may be remotely located apart from the host craft (e.g., satellite monitoring station). Imaging data from assembly 100 is transmitted to system 206, where it may be monitored, analyzed, processed or stored. If a change is desired in the imaging data being collected by assembly 100, system 206 may initiate changes in the position of the host craft, assembly 100, the individual sensors within assembly 100, or any combination thereof.

If a change in the position of the host craft is desired, system 206 provides notification of the desired change to flight control system 202 via communicative link 210 (e.g., change altitude). Link 210 may comprise a direct, physical connector (e.g., wire, cable) or an indirect communications connection (e.g., wireless transceivers). System 202 may comprise a number of collocated or remote navigation systems or combinations thereof—from a pilot onboard an aircraft to a remote flight control system on a satellite.

If a change in the position of assembly 100, with respect to the host craft or housing 104, is desired, system 206 provides notification of the desired change to system 202 via link 210, which communicates the necessary adjustment to assembly 100 via link 212. Link 212 may comprise a communicative link (e.g., cable, wireless transceivers) that notifies assembly 100 of the desired change (e.g., raise, lower, rotate), leaving assembly 100 to actuate the change via internal or externally associated mechanical systems (e.g., hydraulics). Alternatively, link 212 may comprise a mechanical link that directly effects the desired change itself. Link 210 may comprise a direct, physical connector (e.g., wire, cable) or an indirect communications connection (e.g., wireless transceivers).

If a change in the position of one or more of the individual sensors in assembly 100 is desired, system 206 provides notification of the desired change to camera control system 204 via communicative link 214 (e.g., change position of focal intersection point 132). Link 214 may comprise a direct, physical connector (e.g., wire, cable), or an indirect communications connection (e.g., wireless transceivers). Individual sensors within assembly 100 receive notification of desired changes (e.g., change position, change angle) via links 216, which communicate the necessary adjustments to members 114. Links 216 may comprise communicative links (e.g., cables, wireless transceivers) that notify members 114 of changes desired (e.g., raise, lower, rotate), leaving members 114 to actuate the changes via internal or externally associated mechanical systems (e.g., hydraulics). Alternatively, links 216 may comprise mechanical links that directly effect the desired changes. System 204 may comprise a number of control devices and systems, disposed within assembly 100, located externally but proximal to assembly 100, or remote from assembly 100, or combinations thereof.

Figure 2:
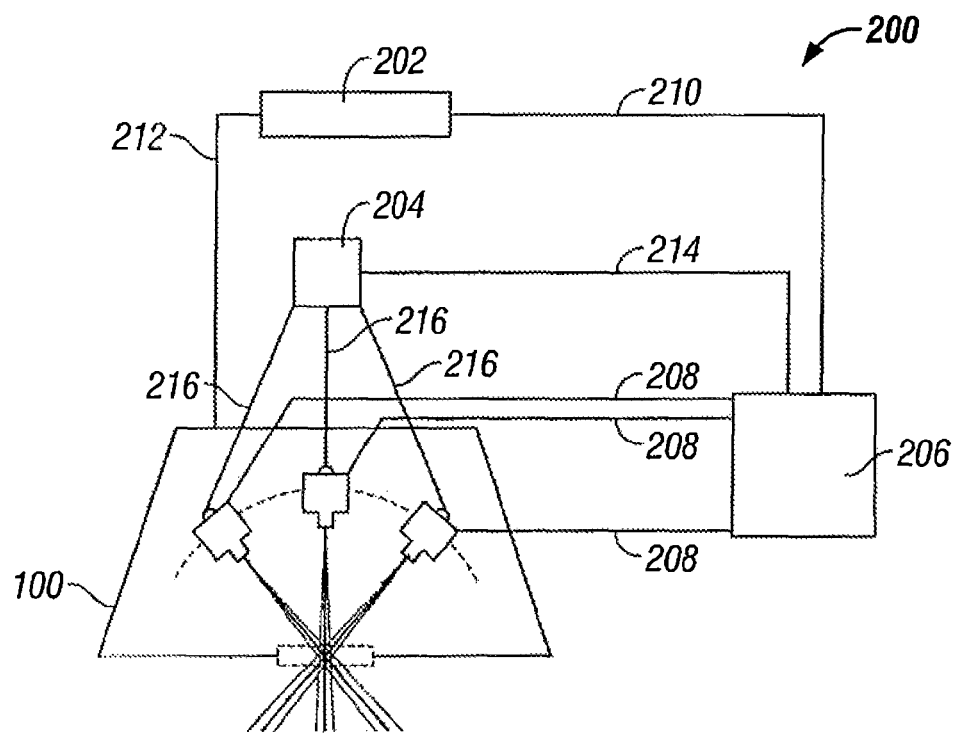
FIG. 2 illustrates one embodiment of a remote imaging system according to the present invention.

Although depicted as separate systems in FIG. 2, systems 202, 204, and 206 may, depending upon the application and host craft or housing 104 configuration, comprise separate functionalities of a single control system deployed within the host craft. Consider for example, a computer-based, self-contained, electromechanical control system on board a manned surveillance aircraft. In other embodiments (e.g., a surveillance satellite), certain elements (e.g., system 202 and 204) may be deployed within the host craft (e.g., the satellite) while other elements (e.g., system 206) are remotely located (e.g., at a monitoring facility). Other combinations of the systems described above are also comprehended by the present invention.

Figure 3:
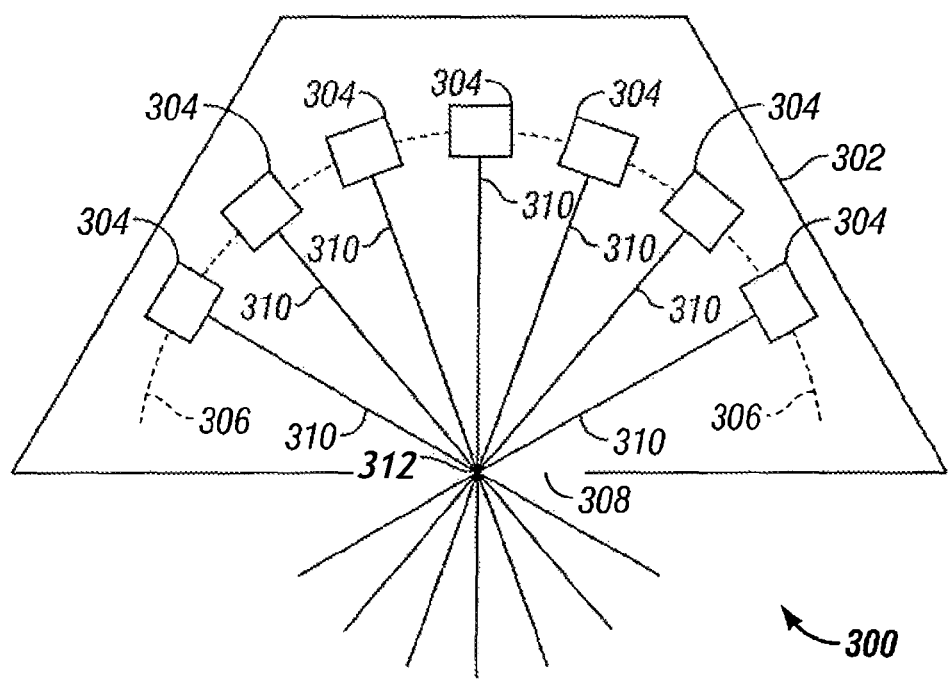
FIG. 3 illustrates a cross-sectional view of one embodiment of an imaging array according to the present invention.

Referring now to FIG. 3, another embodiment of the present invention is provided as an illustrative example. FIG. 3 depicts a camera array assembly 300, comprising a housing 302 within which a plurality of imaging sensors 304 are disposed along a concave curvilinear array axis 306. Assembly 300 is essentially identical in composition, construction, and operation to assembly 100, with the exception of having a greater number of imaging sensors 304 disposed therein. The sensors 304 couple to housing 302, either directly or indirectly, by attachment members (not shown). The sensors 304 may couple collectively to a single transverse cross member 116, individually to lateral cross members 118, or directly to housing 302. Housing 302 comprises an aperture 308 formed in its surface, between the sensors 304 and a target below (not shown). Depending upon the specific type of imaging application and host craft, aperture 308 may comprise a void, a protective screen or window, or a lens or other optical device. Aperture 308 is formed with a size and shape sufficient to provide sensors 304 proper line of sight to a target region.

Sensors 304 are disposed within or along housing 302 such that the focal axes 310 of all sensors 304 converge and intersect each other within the area defined by aperture 308. Again, the focal axes 310 of all sensors 304 may intersect at exactly one intersection point 312, or may intersect at a plurality of intersection points all within close proximity to each other and within the area defined by aperture 308. As depicted in FIG. 3, the sensors 304 are disposed within housing 302 along array axis 306 in a "cross-eyed" fashion. One sensor is centrally disposed, with focal axis 310 directed orthogonally from housing 302. The other sensors 304 are alternately disposed within housing 302 along axis 306 such that the focal axis 310 of each sensor 304 converges upon point 312, crosses the focal axis of the central sensor, and aligns its field of view with a target area opposite its respective position in the array. Again, the sensors 304 may comprise a number of imaging devices including individual cameras, infrared sensors, seismic sensors, photo detectors and photocells—either as individual devices or as a group. Preferably sensors 304 are all of a homogenous nature, but they may comprise a combination of varied imaging devices. Again, the relative positions and angles of the sensors 304 may be fixed, or may be manually or mechanically adjustable.

The embodiments described thus far are particularly useful for collecting and processing imaging data extremely wide, rectilinear strips. Using orthophotographic techniques, the rectilinear image can be combined with subsequent images taken along the host craft's flight path to create a composite image having an extremely large FOV. The present invention provides further embodiments that may lessen or eliminate the need for orthophotographic techniques, depending upon the application.

Figure 4A:
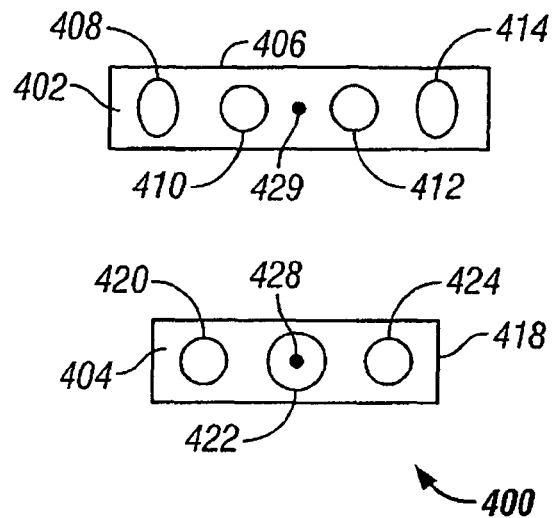
FIG. 4A illustrates a bottom view of one embodiment of an imaging array according to the present invention.
Figure 4B:
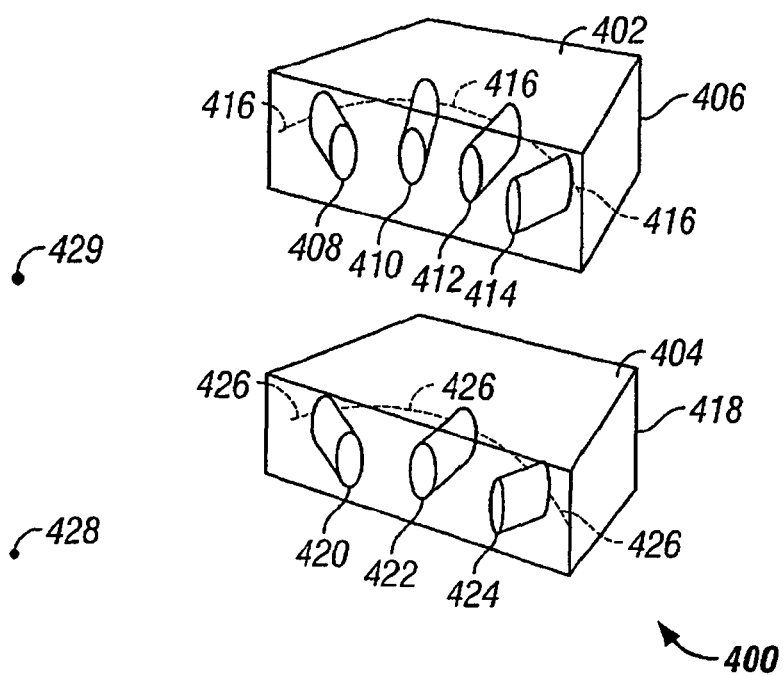
FIG. 4B illustrates a perspective view of the imaging array of FIG. 4A.

One such embodiment is illustrated now with reference to FIGS. 4A and 4B. FIGS. 4A and 4B depict a camera array assembly 400. Except for the differences described hereafter, assembly 400 is similar in composition, construction, and operation to assemblies 100 and 300. As depicted in FIGS. 4A and 4B, assembly 400 comprises first imaging element or array 402 and second array 404. Arrays 402 and 404 are configured as parallel sub-arrays of imaging sensors, longitudinally offset by a desired margin. Array 402 comprises housing 406, within which imaging sensors 408, 410, 412, and 414 are disposed in accordance with the present invention along concave curvilinear array axis 416. Array 404 comprises housing 418, within which imaging sensors 420, 422, and 424 are disposed in accordance with the present invention along concave curvilinear array axis 426. Elements 402 and 404 are disposed within a host craft in close longitudinal proximity to each other, having axes 416 and 426, preferably in parallel alignment, to collect and provide imaging data for a common target region (not shown).

Sensors 408, 410, 412, 414, 420, 422, and 424 are preferably similar in shape and size, but may be of differing shapes and sizes, providing the ability to retrieve an image of the target region having a desired shape or size. Individual sensors having specific shapes and sizes can be disposed and manipulated to focus on image areas that adjoin or overlap in desired patterns. As depicted in FIGS. 4A and 4B, sensor 422 is centrally disposed within housing 418 along array axis 426 such that its focal axis is directed from housing 418 through intersection area 428. Area 428 is a point or small region through which the focal axes of all the imaging sensors within 418 align. Arrays 402 and 404 may be disposed within assembly 400 such that area 428 is orthogonally centered with respect to sensor 422, whereas the array 402 is orthogonal centered on area 429 (as depicted in FIG. 4A).

Sensors 420 and 424, similar in shape and size to sensor 422, are alternately disposed within housing 418 along array axis 426 such that the focal axis of each converges upon area 428, crosses the focal axis of sensor 422, and aligns its field of view with a target area opposite its respective position in the array 404.

Sensors 410 and 412, similar in shape and size to sensor 422, are alternately disposed within housing 406 along array axis 416 such that the focal axis of each converges upon area 429 and align their field of view with a target area opposite their respective position in the array 404. Sensors 410 and 412 are disposed within housing 406 such that their fields of view align with the gaps between sensors 420, 422, and 424.

Sensors 408 and 414, preferably of similar size and shape as sensor 422, are alternately disposed within housing 406 along array axis 416 such that the focal axis of each converges upon area 429. Sensors 410 and 412 are disposed within housing 406, outside sensors 410 and 412, such that their fields of view align outside all sensors in element 404. The slight offset in the sensors of elements 402 and 404 provide assembly 400 with the ability to produce images having customizable FOVs. In alternative embodiments, any number of arrays, containing any number of sensors having various shapes and sizes, may be combined to provide imaging data on any desired target region. In such embodiments, the resulting offset in images collected by the sub-arrays of assembly 400 may be resolved with one another, using a variety of image processing techniques, to provide a single high-resolution image.

Figure 5:
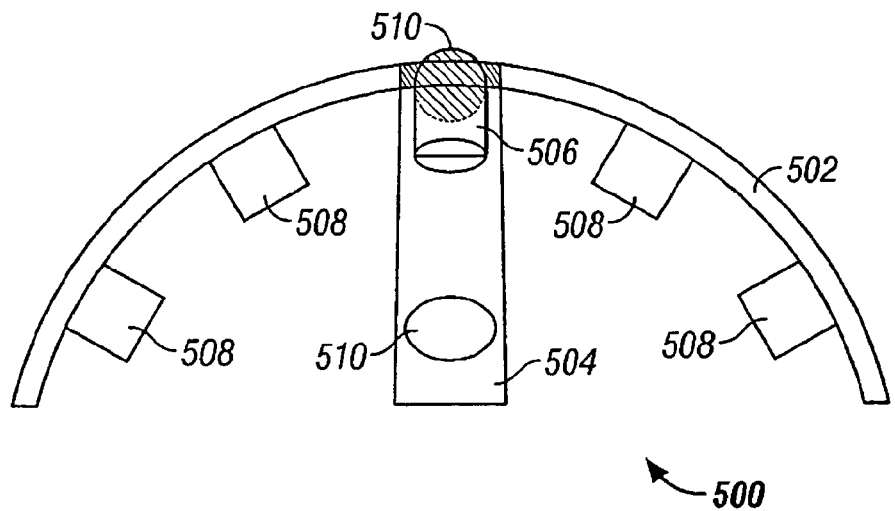
FIG. 5 illustrates a cross-sectional view of one embodiment of an imaging array according to the present invention.

In still another embodiment of the present invention, depicted in FIG. 5, a cross-sectional view of a camera array assembly 500 is illustrated. Except for the differences described hereafter, assembly 500 is similar in composition, construction, and operation to assemblies 100, 300 and 400. Assembly 500 comprises a first compound member 502, shown in side view, and a second compound member 504, shown in cross-sectional view. Member 502 comprises a curvilinear support member or array, to which a number of imaging sensors 508 are disposed along its concave side. A primary imaging sensor 506 is centrally disposed along the concave side of member 502, with its focal axis directed orthogonally downward from assembly 500.

A number of imaging sensors 508 are also disposed along the concave side of member 502, in a "cross-eyed" fashion. The cross-eyed sensors 508 are alternately disposed along member 502 such that the focal axis of each sensor 508 converges upon and crosses the focal axis of sensor 506 at a single intersection area (not shown), and aligns its field of view with a target area opposite its respective position in the array.

Member 504 also comprises a curvilinear support member or array, to which a number of imaging sensors 510 are disposed along its concave side. Member 504 is preferably formed orthogonal to 502 and is of a size and curvature sufficient to match the arch of member 502. Member 504 may be formed or disposed such that its concave surface contacts, or even couples to, the convex surface of member 502 at its apex. Alternatively, member 504 may bridge over member 502, clearing its apex within proximal distance thereto. Imaging sensors 510 are disposed along the concave side of member 504, in a "cross-eyed" fashion. The cross-eyed sensors 510 are alternately disposed along member 502 such that the focal axis of each sensor 510 converges upon and crosses the focal axis of sensor 506 at the single intersection area, and aligns its field of view with a target area opposite its respective position in the array.

The distance and angular offsets in the sensors of elements 502 and 504, coupled with the shared intersection area, provide assembly 500 with the ability to produce images having customizable FOVs. Depending upon the elements and sensors utilized, assembly 500 may be deployed to produce stereoscopic images. In alternative embodiments, any number of elements, containing any number of sensors having various shapes and sizes, may be combined to provide imaging data on any desired target region.

Figure 6:
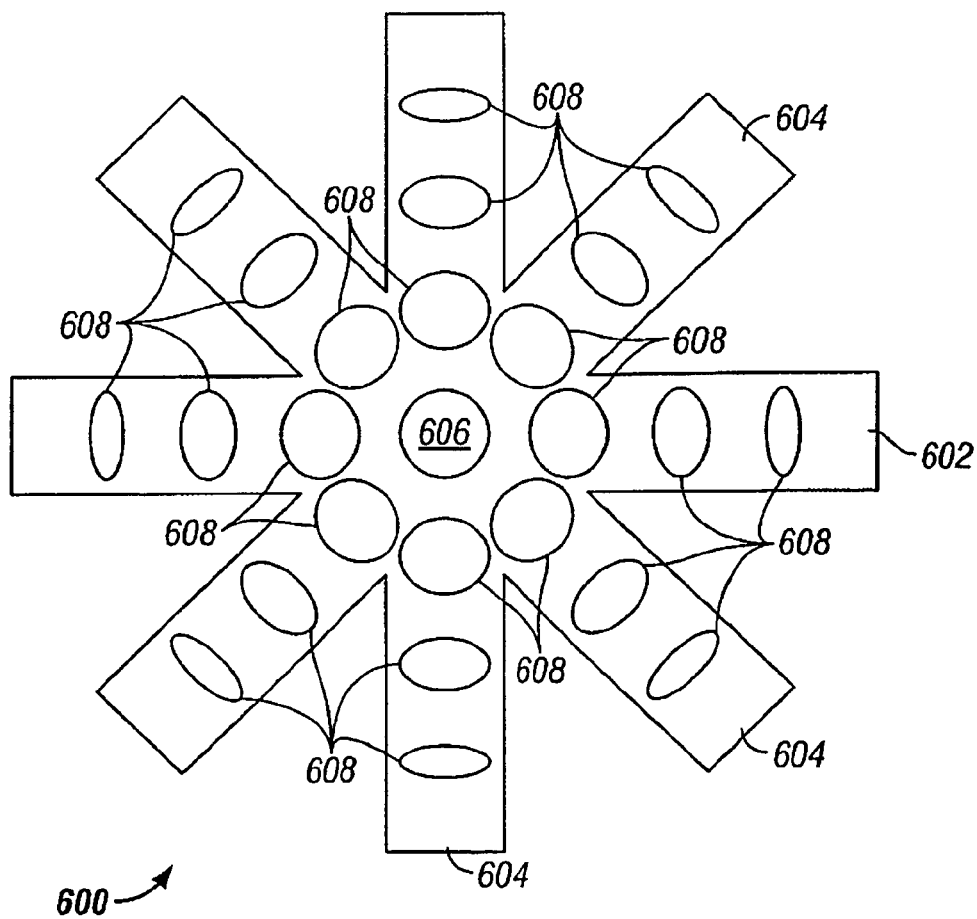
FIG. 6 illustrates a bottom view of one embodiment of an imaging array according to the present invention.

Another embodiment, enhancing the advantages of assembly 500, is illustrated in FIG. 6. FIG. 6 depicts a camera array assembly 600 from a bottom view. Assembly 600 comprises a primary compound curvilinear member or array 602, and a plurality of compound curvilinear members 604 that are formed of size and curvature sufficient to offset and arch over or contact member 602 at various angular intervals. Any number of members 604 may be employed, and may be so numerous as to form a dome structure for mounting sensors. The angular displacement between the members 604 varies depending upon the size of the members and the desired imaging characteristics. For example, assembly 600 may comprise two support members in an orthogonal (i.e. 90°) relationship with one another. Another assembly, having three support members, may be configured such that the angular displacement between members is 60°.

A primary imaging sensor 606 is centrally disposed along the concave side of member 602, with its focal axis directed orthogonally downward from assembly 600. A number of imaging sensors 608 are disposed, in accordance with the teachings of the present invention, along the concave sides of members 602 and 604 in a "cross-eyed" fashion. The cross-eyed sensors 608 are alternately disposed along members 602 and 604 such that the focal axis of each sensor preferably converges upon and crosses the focal axis of sensor 606 at a single intersection area (not shown), and aligns its field of view with a target area opposite its respective position in the array. Depending upon the shape and size of sensors 608, assembly 600 provides the ability to produce images having customizable FOVs, of a generally circular nature. Depending upon the elements and sensors utilized, assembly 600 may be deployed to produce stereoscopic images. In alternative embodiments, any number of elements, containing any number of sensors having various shapes and sizes, may be combined to provide imaging data on any desired target region.

Figure 7:
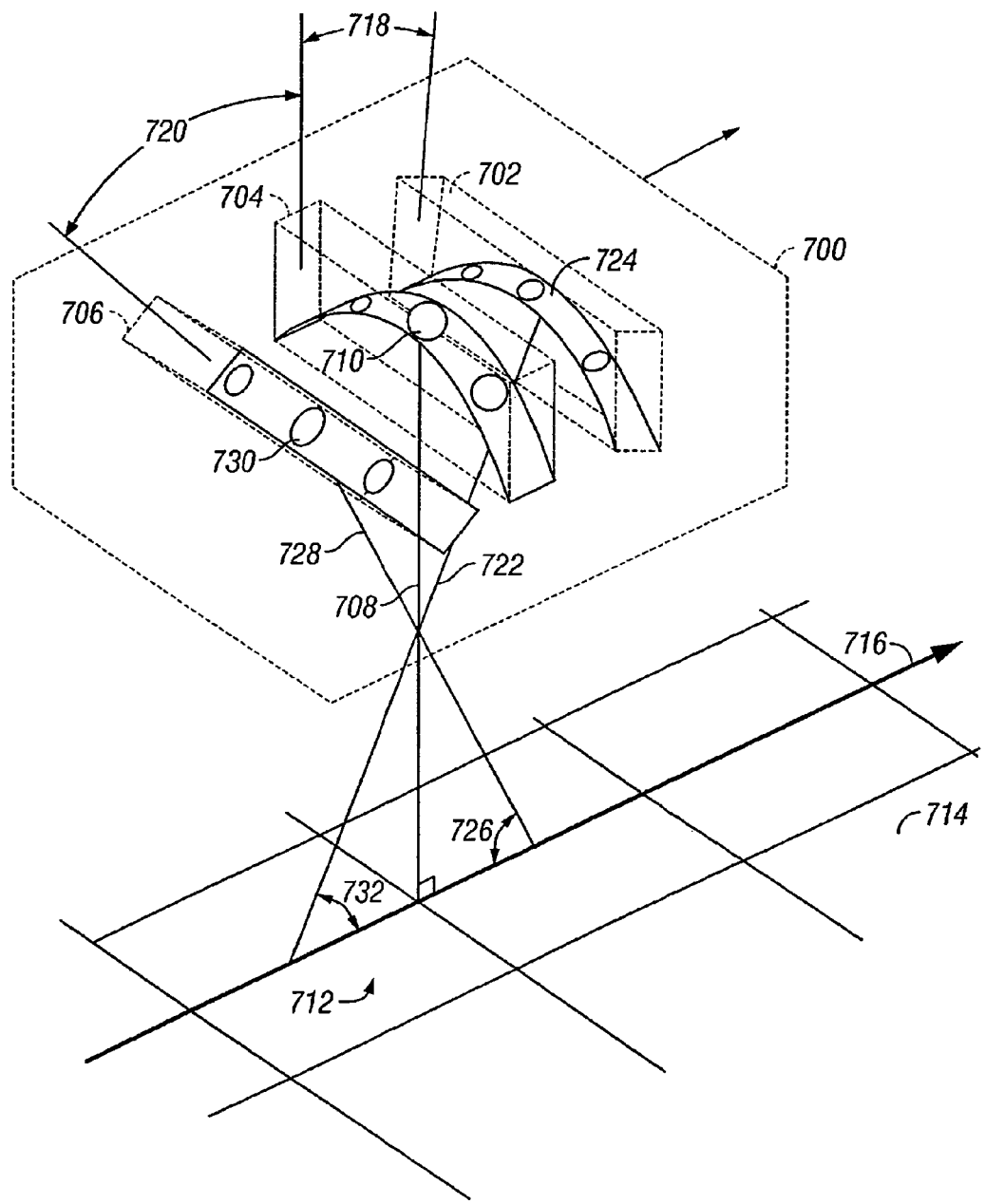
FIG. 7 illustrates one embodiment of a remote imaging system according to the present invention.

Referring now to FIG. 7, one embodiment of a camera array assembly 700 in accordance with the present invention is depicted. Assembly 700 is similar in composition, construction, and operation to assemblies 100, 300 and 400. Assembly 700 comprises first imaging element or array 702, second imaging array 704, and third imaging array 706. Array 704 is configured as a primary sensor array, disposed within assembly 700 such that the focal axis 708 of its primary sensor 710 is directed downwardly from assembly 700, orthogonal to target area 712 along terrain 714. Assembly 700 is disposed within a host craft that moves, with respect to terrain 714, along flight path 716. Elements 702, 704 and 706 are configured within assembly 700 as sub-arrays of imaging sensors. Element 702 is offset, with respect to flight path 716, ahead of element 704 and offset there from by angular offset 718. Similarly, element 706 is offset, with respect to flight path 716, behind element 704 and offset there from by angular offset 720. Angular offset 718 is selected such that the focal axis 722 of primary sensor 724 on element 702 is directed downward to target area 712, forming angle 732. Angular offset 720 is selected such that the focal axis 728 of primary sensor 730 on element 706 is directed downward to target area 712, forming angle 726. Angular offsets 718 and 720 are preferably equal, although they may be skewed to provide a desired imaging effect. The focal axes of the other individual sensors along elements 702, 704 and 706 form similar angular relationship to target area 712 and one another, subject to their respective positions along the elements. Imaging data is characterized, on a pixel-by-pixel basis, in terms of the positional and angular relationships described above.

Knowing the positional and angular relationships among elements 702, 704, 706, and their constituent individual sensors, imaging data collected by assembly 700 are processed to provide high-resolution orthographic images. In alternative embodiments, the elements and sensors are configured, and the data collected is processed, to provide high-resolution stereographic images. The size and resolution of the imaging array may be altered in accordance with the present as described above.

In another embodiment of the present invention, the camera assembly 700 is modified and comprises one imaging element or array 702, configured as a primary sensor array, as described above, and having an actuator or motor (not shown) that rocks or moves the array 402 back and forth. Alternatively, the actuator may flip or rotate the array 702. In one preferred embodiment, the array 702 is directed to forward, downward, and backward positions. In another embodiment of the invention, the array 702 is stationary, and a moving mirror system is used in conjunction with the mirror system to collect sensor data from multiple positions of the terrain 714.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A compound camera system for producing an image of a target, comprising:
    a mount unit adaptably mountable to a vehicle, wherein the mount unit has an aperture formed in the mount unit between a first array and a second array and the target, and wherein the aperture is selected from a group consisting of a void, a screen, a window and an optical device not including a lens;
    the first array comprising a first imaging sensor having a first lens, disposed within the mount unit, and having a first focal axis;
    at least one second imaging sensor having at least a second lens, disposed within the mount unit and offset from the first imaging sensor in across track, cross-eyed fashion, and having at least a second focal axis, wherein the first and second focal axes pass through the aperture;
    the second array angularly disposed with respect to the first array, the second array comprising a third imaging sensor having a third lens, disposed within the mount unit, and having a third focal axis; and
    at least one fourth imaging sensor having at least a fourth lens, disposed within the mount unit and offset from the third imaging sensor in cross-eyed fashion, and having at least a third focal axis, wherein the third and fourth focal axes pass through the aperture.

2. The system of claim 1, wherein the first array has an apex; and wherein the second array is adapted to meet the apex of the first array.

3. The system of claim 2, wherein the focal axes intersect within an intersection area.

4. The system of claim 2, wherein the focal axes pass through an aperture, and wherein the aperture is selected from the group consisting of a void, a screen, a window and an optical device not including a lens.

5. The system of claim 4, wherein the focal axes intersect at an aperture.

6. The system of claim 2, wherein the focal axes intersect at a target.

7. The system of claim 2, wherein the arrays are parallel to each other.

8. The system of claim 2, wherein all imaging sensors are of similar size and shape.

9. The system of claim 2, wherein the imaging sensors are of varied size and shape.

10. The system of claim 2, wherein the imaging sensors comprise cameras.

11. The system of claim 2, wherein the imaging sensors comprise infrared sensors.

12. The system of claim 1, wherein the first imaging sensor is centrally disposed within the mount unit.

13. The system of claim 1, wherein the focal axes intersect within an intersection area.

14. The system of claim 1, wherein the focal axes intersect at the target.

15. The system of claim 1, wherein all imaging sensors are of similar size and shape.

16. The system of claim 1, wherein the imaging sensors are of varied size and shape.

17. The system of claim 1, wherein the imaging sensors comprise cameras.

18. The system of claim 1, wherein the imaging sensors comprise infrared sensors.

19. The system of claim 1, wherein the focal axes intersect within an intersection area.

20. A compound camera system for producing an image area of a target viewed through an aperture, comprising:
    a mount unit adaptably mountable to a vehicle, wherein the mount unit has an aperture formed in the mount unit between a first array and the target, and wherein the aperture is selected from the group consisting of a void, a screen, a window and an optical device not including a lens; and
    the first array comprising at least two imaging sensors coupled to the mount unit in across track, cross-eyed fashion, each imaging sensor producing a portion of the image area, each having a focal axis passing through the aperture without using a mirror, and each imaging sensor having its own lens.

21. The system of claim 20, wherein the focal axes intersect within an intersection area.

22. The system of claim 20, wherein the focal axes intersect at the target.

23. The system of claim 20, wherein an intersection area is located along at least one focal axis and at a location from the aperture of the mount unit to before the target.

24. A compound camera system for producing an image of a target area, comprising:
    a mount unit adaptably mountable to a vehicle, wherein the mount unit has an aperture formed in the mount unit between a first array and the target area, and wherein the aperture is selected from a group consisting of a void, a screen, a window and an optical device not including a lens;

the first array comprising a first imaging sensor having a first lens, disposed within the mount unit, and having a first focal axis; and at least one second imaging sensor having at least a second lens, disposed within the mount unit and offset from the first imaging sensor in across track, cross-eyed fashion, and having at least a second focal axis, wherein the first and second focal axes pass through the aperture without using a minor.

25. The system of claim 24, further comprising a second array angularly disposed with respect to the first array, the second array comprising a third imaging sensor having a third lens, disposed within the mount unit, and having a third focal axis; and at least one fourth imaging sensor having at least a fourth lens, disposed within the mount and offset from the third imaging sensor in cross-eyed fashion, and having at least a third focal axis, wherein the third and fourth focal axes pass through the aperture.

26. The system of claim 25, wherein the first imaging sensor is centrally disposed within the mount unit.

27. The system of claim 24, wherein the first and second arrays are parallel to each other.

28. The system of claim 24, wherein the first array is centrally coupled to the mount unit and the second array is offset from the first array and angled so that the focal points of the first array and the second array coincide on the target.

\* \* \* \* \*

UNITED STATES PATENT AND TRADEMARK OFFICE
CERTIFICATE OF CORRECTION

PATENT NO.        : 8,896,695 B2
APPLICATION NO.   : 12/462533
DATED             : November 25, 2014
INVENTOR(S)       : Leo J. Peters, III and Chester L. Smitherman It is certified that error appears in the above-identified patent and that said Letters Patent is hereby corrected as shown below:

In the Claims,

Claim 24 at Column 13, line 11, the word "minor" should read --mirror--.

Signed and Sealed this
Nineteenth Day of May, 2015

Michelle K. Lee
*Director of the United States Patent and Trademark Office*